(12) United States Patent
Kohn et al.

(10) Patent No.: US 11,892,809 B2
(45) Date of Patent: Feb. 6, 2024

(54) CONTROLLING OPERATION OF AN ELECTRICAL GRID USING REINFORCEMENT LEARNING AND MULTI-PARTICLE MODELING

(71) Applicant: Veritone Alpha, Inc., Costa Mesa, CA (US)

(72) Inventors: Wolf Kohn, Seattle, WA (US); Chad Edward Steelberg, Newport Beach, CA (US); Andrew Elvin Badgett, Boulder, CO (US); Leslie Gene Engelbrecht, Niwot, CO (US)

(73) Assignee: Veritone, Inc., Irvine, CA (US)

( * ) Notice: Subject to any disclaimer, the term of this patent is extended or adjusted under 35 U.S.C. 154(b) by 318 days.

(21) Appl. No.: 17/385,764

(22) Filed: Jul. 26, 2021

(65) Prior Publication Data
US 2023/0041412 A1 Feb. 9, 2023

(51) Int. Cl.
*G05B 13/02* (2006.01)
*G06N 20/00* (2019.01)
(Continued)

(52) U.S. Cl.
CPC ......... *G05B 13/0265* (2013.01); *G05B 13/04* (2013.01); *G06N 3/006* (2013.01);
(Continued)

(58) Field of Classification Search
CPC ........ H02J 4/00; H02J 3/00; H02J 5/00; H02J 2203/20; G05B 13/042; Y02B 70/3225; Y04S 20/222; G06Q 50/06
See application file for complete search history.

(56) References Cited

U.S. PATENT DOCUMENTS

| | | |
|---|---|---|
| 5,724,239 A | 3/1998 | Kaneko |
| 5,727,128 A | 3/1998 | Morrison |

(Continued)

FOREIGN PATENT DOCUMENTS

| | | | | |
|---|---|---|---|---|
| CN | 112615379 | * | 4/2021 | ............ G06F 30/27 |
| JP | 2008-546370 A | | 12/2008 | |

(Continued)

OTHER PUBLICATIONS

Wang et al, "A Modified Particle Swarm Optimization Algorithm and Its Application in Optimal Power Flow Problem", pp. 2885-2889, 2005 downloaded from https://ieeexplore.ieee.org/abstract/document/1527435 (Year: 2005).*

(Continued)

*Primary Examiner* — Robert E Fennema
*Assistant Examiner* — Olvin Lopez Alvarez
(74) *Attorney, Agent, or Firm* — VLP Law Group LLP; James A. D. White

(57) ABSTRACT

Techniques are described for implementing an automated control system to control operations of a target physical system, such as production of electrical power in an electrical grid. The techniques may include determining how much electrical power for each of multiple producers to supply for each of a series of time periods, such as to satisfy projected demand for that time period while maximizing one or more indicated goals, and initiating corresponding control actions. The techniques may further include repeatedly performing automated modifications to the control system's ongoing operations to improve the target system's functionality, by using reinforcement learning to iteratively optimize particles generated for a time period that represent different state information within the target system, to learn one or more possible solutions for satisfying projected electrical (Continued)

power load during that time period while best meeting the one or more defined goals.

30 Claims, 16 Drawing Sheets

(51) Int. Cl.
G06N 3/00 (2023.01)
G05B 13/04 (2006.01)
H02J 3/38 (2006.01)
G06N 3/006 (2023.01)

(52) U.S. Cl.
CPC .............. *G06N 20/00* (2019.01); *H02J 3/381* (2013.01); *H02J 2203/20* (2020.01)

(56) References Cited

U.S. PATENT DOCUMENTS

| | | |
|---|---|---|
| 5,755,378 A | 5/1998 | Dage |
| 5,963,447 A | 10/1999 | Kohn |
| 6,088,689 A | 7/2000 | Kohn |
| 6,694,044 B1 | 2/2004 | Pavlovic et al. |
| 7,052,105 B2 | 5/2006 | Ushigome |
| 7,072,723 B2 | 7/2006 | Kohn et al. |
| 7,216,004 B2 | 5/2007 | Kohn et al. |
| 7,574,383 B1 | 8/2009 | Parasnis et al. |
| RE42,284 E | 4/2011 | Severson |
| 8,261,283 B2 | 9/2012 | Tsafrir et al. |
| 8,606,788 B2 | 4/2013 | Downs et al. |
| 8,949,772 B1 | 2/2015 | Talby et al. |
| 8,977,874 B2 | 3/2015 | Rabii |
| 9,946,517 B2 | 4/2018 | Talby et al. |
| 10,223,656 B2 | 3/2019 | Kopp |
| 10,386,422 B2 | 8/2019 | Christensen |
| 10,424,961 B1 | 9/2019 | Maluf |
| 10,452,045 B1 | 10/2019 | Kohn |
| 10,520,905 B2 | 12/2019 | Cross |
| 10,601,316 B2 | 3/2020 | Kohn |
| 10,762,424 B2* | 9/2020 | Nazari ..................... G06F 17/18 |
| 2002/0049899 A1 | 4/2002 | Kenworthy |
| 2003/0069868 A1 | 4/2003 | Vos |
| 2003/0234812 A1 | 12/2003 | Drucker et al. |
| 2004/0260666 A1 | 12/2004 | Pestotnik et al. |
| 2005/0102044 A1 | 5/2005 | Kohn et al. |
| 2005/0273413 A1 | 12/2005 | Vaudrie |
| 2006/0218074 A1 | 9/2006 | Kohn |
| 2006/0229769 A1 | 10/2006 | Grichnik et al. |
| 2008/0167756 A1 | 7/2008 | Golden et al. |
| 2009/0113049 A1 | 4/2009 | Nasle |
| 2011/0035071 A1 | 2/2011 | Sun |
| 2011/0178622 A1 | 7/2011 | Tuszynski |
| 2011/0298626 A1 | 12/2011 | Fechalos et al. |
| 2012/0072181 A1 | 3/2012 | Imani |
| 2012/0143356 A1 | 6/2012 | Berg-Sonne |
| 2012/0274281 A1 | 11/2012 | Kim |
| 2012/0283887 A1 | 11/2012 | Goldsmith et al. |
| 2013/0080530 A1 | 3/2013 | Frees et al. |
| 2013/0099576 A1 | 4/2013 | Chuah et al. |
| 2013/0119916 A1 | 5/2013 | Wang et al. |
| 2013/0253942 A1 | 9/2013 | Liu et al. |
| 2013/0274936 A1 | 10/2013 | Donahue et al. |
| 2014/0114517 A1 | 4/2014 | Tani et al. |
| 2014/0217976 A1 | 8/2014 | McGrath |
| 2014/0250377 A1 | 9/2014 | Bisca et al. |
| 2014/0277600 A1 | 9/2014 | Kolinsky et al. |
| 2015/0032394 A1 | 1/2015 | Kimura et al. |
| 2015/0039145 A1* | 2/2015 | Yang ........................ H02J 3/00 700/291 |
| 2015/0058078 A1 | 2/2015 | Ehrenberg et al. |
| 2015/0184550 A1 | 7/2015 | Wichmann |
| 2015/0253749 A1 | 9/2015 | Kniazev et al. |
| 2015/0279182 A1 | 10/2015 | Kanaujia et al. |
| 2015/0370228 A1 | 12/2015 | Kohn et al. |
| 2015/0370232 A1 | 12/2015 | Kohn et al. |
| 2016/0004228 A1 | 1/2016 | Kohn |
| 2016/0018806 A1 | 1/2016 | Kohn et al. |
| 2016/0125435 A1 | 5/2016 | Kohn et al. |
| 2016/0216708 A1 | 7/2016 | Krivoshein et al. |
| 2016/0239759 A1 | 8/2016 | Sung |
| 2017/0219660 A1 | 8/2017 | Christensen |
| 2017/0271984 A1 | 9/2017 | Kohn et al. |
| 2017/0315517 A1 | 11/2017 | da Silva et al. |
| 2017/0315523 A1 | 11/2017 | Cross et al. |
| 2017/0329289 A1* | 11/2017 | Kohn ....................... F24F 11/46 |
| 2019/0171968 A1* | 6/2019 | Nasle ..................... G06N 20/00 |
| 2021/0143639 A1* | 5/2021 | Duan ...................... H02J 3/242 |

FOREIGN PATENT DOCUMENTS

| | | |
|---|---|---|
| JP | 2015-025685 A | 2/2015 |
| JP | 2016-105672 A | 6/2016 |
| JP | 6584040 B2 | 10/2019 |
| WO | 2014030349 A1 | 2/2014 |
| WO | 2014089959 A1 | 6/2014 |
| WO | 2016025080 A1 | 2/2016 |

OTHER PUBLICATIONS

Hitoshi et al, "Reinforcement Learning through Interaction among Multiple Agents", 2006, pp. 2457-2462, downloaded from https://ieeexplore.ieee.org/stamp/stamp.jsp?arnumber=4108054 (Year: 2006).*
Biswas et al, "Real-Time Optimal Energy Management of Electrified Powertrains with Reinforcement Learning" pp. 6, 2019 https://ieeexplore.ieee.org/abstract/document/8790482 (Year: 2019).*
Hyndman, "Forecasting: Principles & Practice", Workshop at University Of Western Australia (robjhyndman.com/uwa), Sep. 23-25, 2014, 138 pages.
Leng et al., "Effect of Temperature on the Aging Rate of Li Ion Battery Operating Above Room Temperature," Scientific Reports 5:12967, Aug. 2015, 12 pages.
Shim et al., "Past, present, and future of decision support technology", Decision Support Systems 33 (2002), 16 pages (pp. 111-126).
Liserre et al., "Future Energy Systems", IEEE Industrial Electronics Magazine, Mar. 2010, 20 pages (pp. 18-37).
Sarkis, "A strategic decision framework for green supply chain management", Journal of Cleaner Production 11 (2003) 13 pages (pp. 397-409).
Chong et al., "Sensor Networks: Evolution, Opportunities, and Challenges", Proceedings Of The IEEE, vol. 91, No. 8, Aug. 2003, 10 pages (pp. 1247-1256).
Ge et al., "Hybrid Systems: Chattering Approximation to Relaxed Controls," Lecture Notes in Computer Science vol. 1066: Hybrid Systems 111, 1996, 25 pages.
Kohn et al., "Multiple Agent Hybrid Control: Carrier Manifolds and Chattering Approximations to Optimal Control," 33rd Conference on Decision and Control Lake Buena Vista, FL, Dec. 1994, 7 pages.
Kohn et al., "A Hybrid Systems Approach to Computer-Aided Control Engineering," IEEE Control Systems 15(2), 1995, 30 pages.
Kohn et al., "Hybrid Systems as Finsler Manifolds: Finite State Control as Approximation to Connections," Lecture Notes in Comvuter Science vol. 999: Hybrid Systems II, 1995, 28 pages.
Kohn et al., "Viability in Hybrid Systems," Theoretical Computer Science 138, 1995, 28 pages.
Kohn et al., "Digital to Hybrid Program Transformations," IEEE International Symposium on Intelligent Control, Dearborn, MI, Sep. 15-18, 1996, 6 pages.
Kohn et al., "Hybrid Dynamic Programming," Lecture Notes in Computer Science vol. 1201: Hybrid and Real-Time Systems, 1997, 7 pages.
Kohn et al., "Implementing Sensor Fusion Using a Cost-Based Approach," American Control Conference, Albuquerque, NM, Jun. 1997, 5 pages.
Kohn et al., "Control Synthesis in Hybrid Systems with Finsler Dynamics," Houston Journal of Mathematics 28(2), 2002, 23 pages.
Kohn et al., "A Micro-Grid Distributed Intelligent Control and Management System," IEEE Transactions on Smart Grid 6(6), Nov. 2015, 11 pages.

(56) References Cited

OTHER PUBLICATIONS

Uddin, K., "The effects of high frequency current ripple on electric vehicle battery performance," Applied Energy 178 (2016), 13 pages.
Schutter, B. De "Minimal state-space realization in linear system theory: an overview", Journal of Computational and Applied Mathematics, 121 (2000) 331-354, 24 pages.
Reinforcement Learning, Wikipedia, accessed Feb. 16, 2021 from https://en.wikipedia.org/wiki/Reinforcement_learning, 13 pages.
Basu, Meheli, "Optimal Dispatch in Smart Power Grids with partially known deviation", available at https://doi.org/10.17077/etd.e0lol3pd, Summer 2015, 51 pages.

* cited by examiner

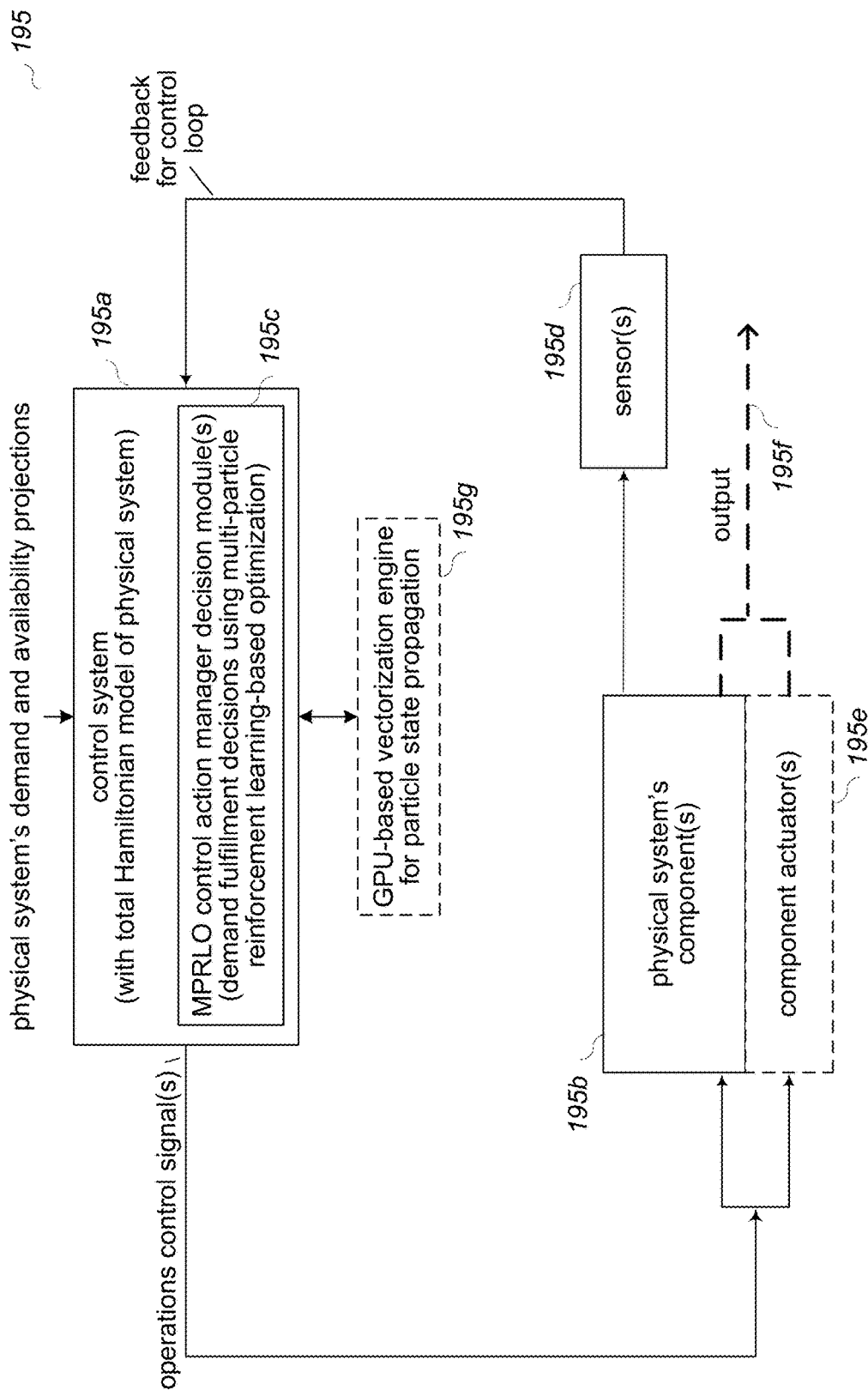

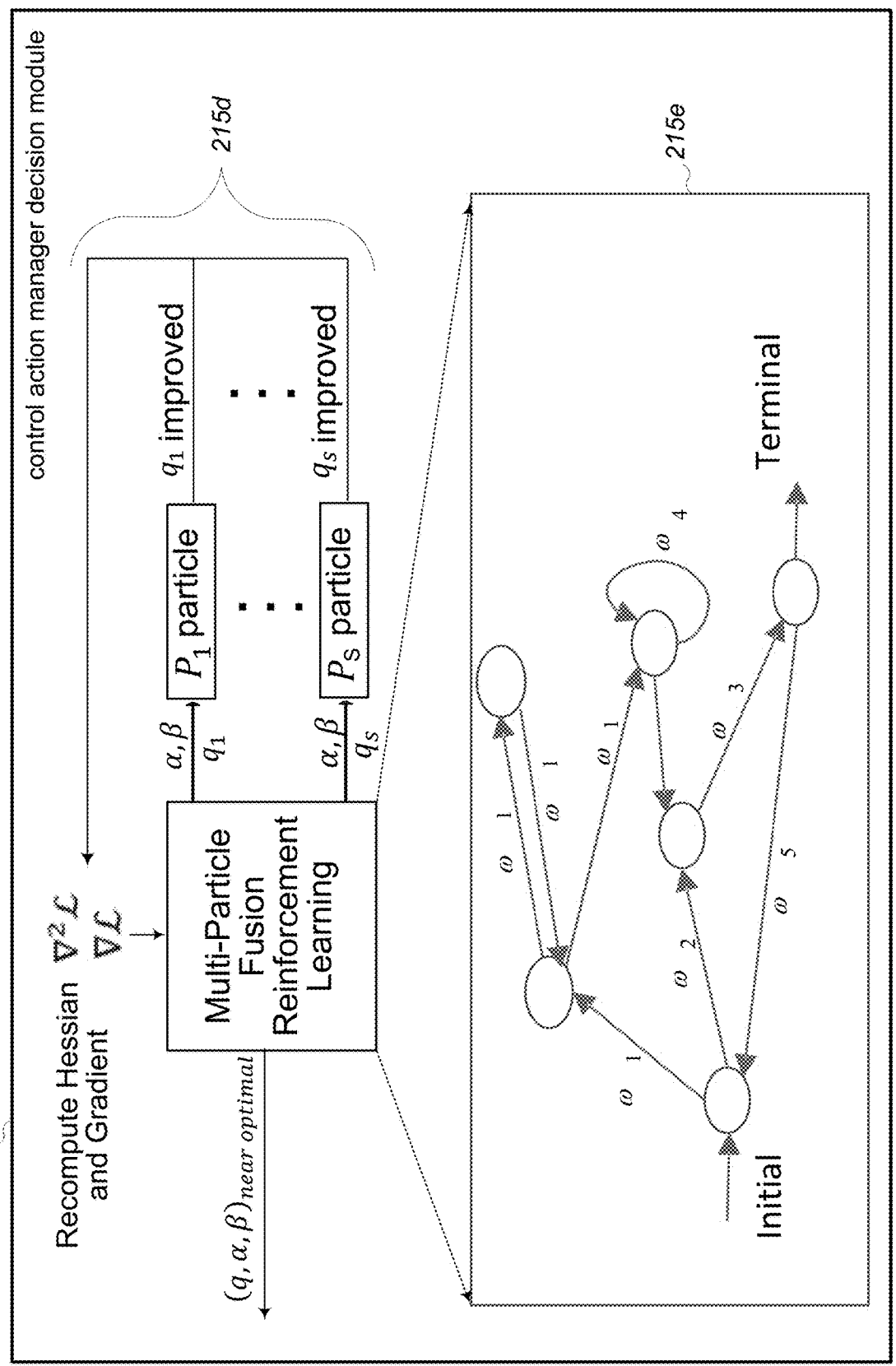

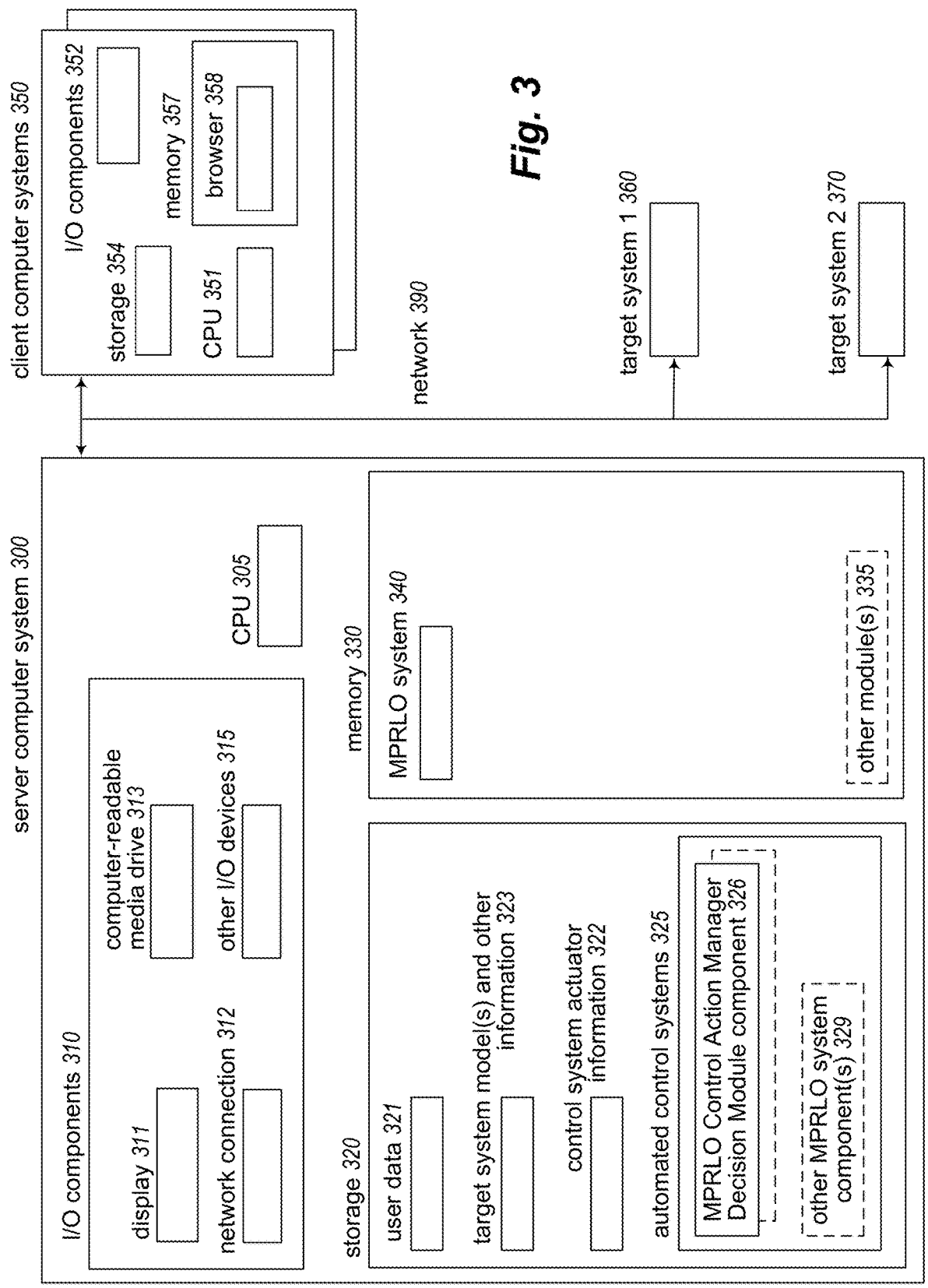

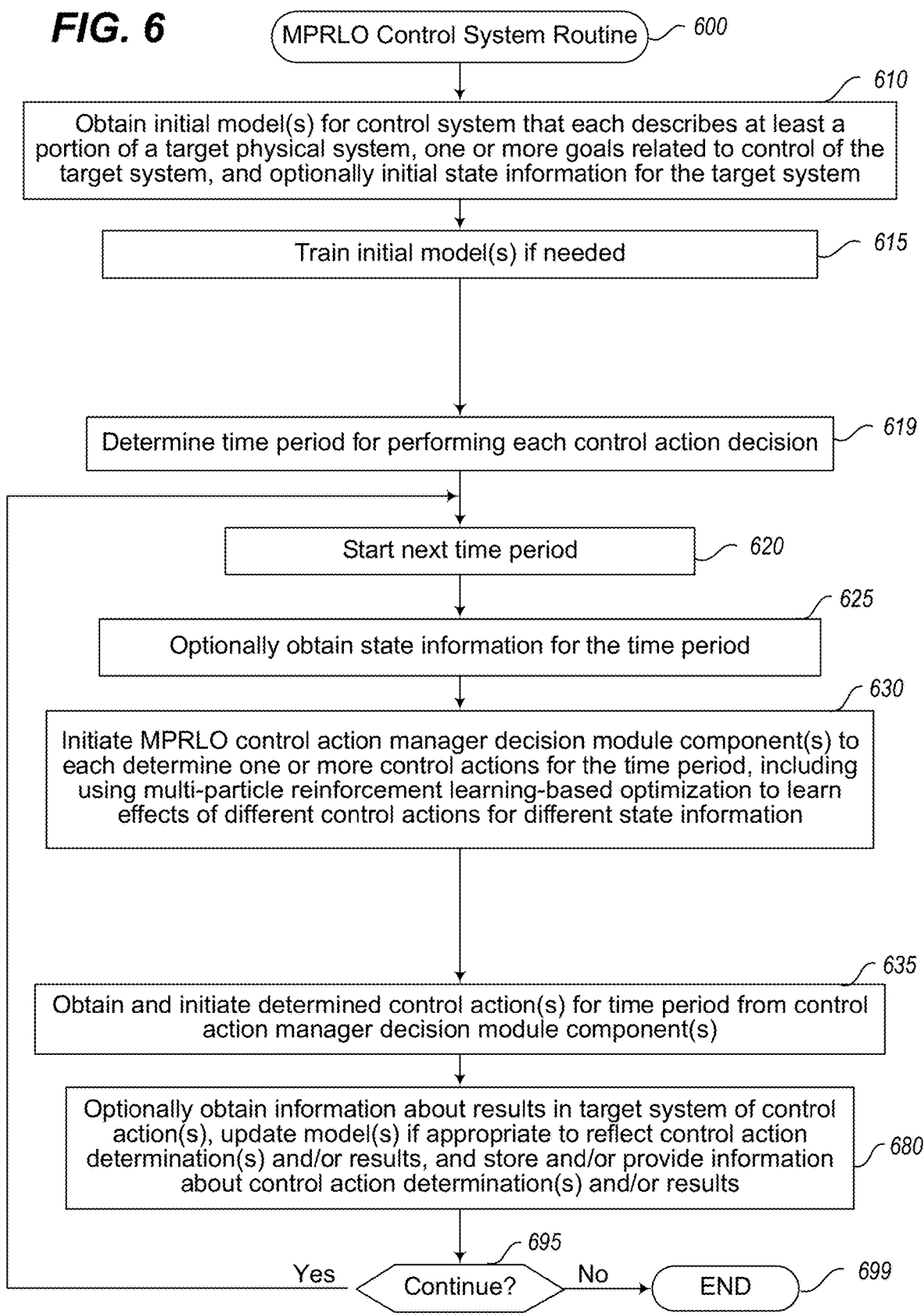

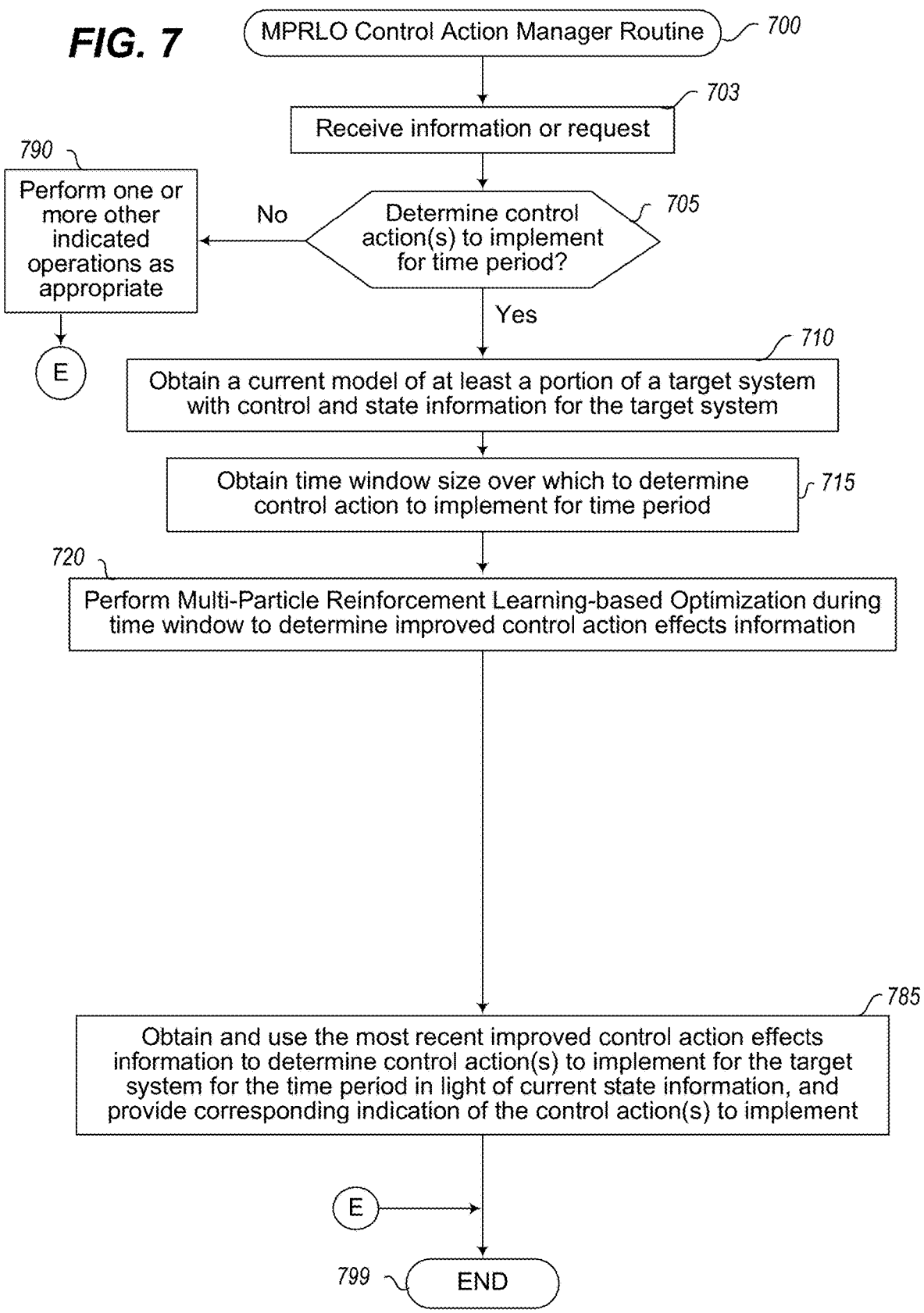

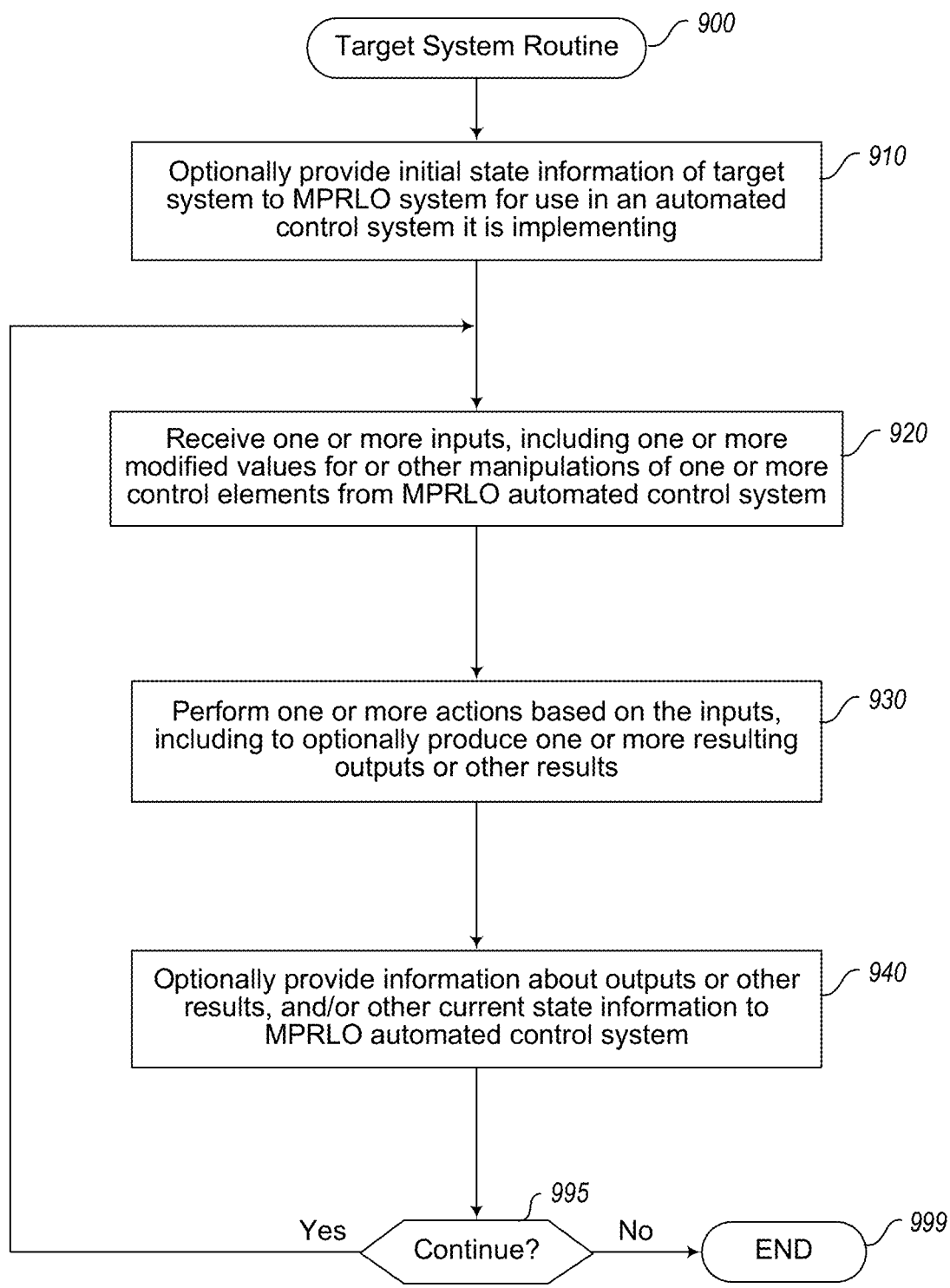

1) Read $q_0^i$ $Q_0^i$ $\alpha^i$ $\beta^i$ $\quad \alpha, \beta < 1$

2) Read $M^i = \nabla^2 \mathcal{L}(q_0^i)$ & $N^i = \nabla \mathcal{L}(q_0^i(t))$ 3) Set $k = 0, l = 0$ 4) $Q_{l+1}^i(k) = \alpha^i Q_l^i(k) - \alpha^i N^i Q_l^i(k) + N^i$ Evaluate Hamiltonian H[] 
   If not H[] constant, annihilate particle
   Else: continue 5) Check $|Q_{l+1}^i(k) - Q_l^i(k)| < \epsilon_Q$ IF TRUE $q_{(k+1)}^i = \beta^i q_k^i - \beta^i N^i M^i$ 6) Check $|q_{k+1}^i - q_k^i| < \epsilon_Q$, if TRUE, write $q_{(k+1)}^i$ and exit

*Kullback Leibler entropy check*

Repeat step 4

CONTROLLING OPERATION OF AN ELECTRICAL GRID USING REINFORCEMENT LEARNING AND MULTI-PARTICLE MODELING

TECHNICAL FIELD

The following disclosure relates generally to techniques for an automated control system to control operations of one or more physical systems based at least in part on state information for the physical system(s), such as to improve ongoing electrical power production operations or other functionality of an electrical grid of the physical system(s) using multi-particle modeling and reinforcement learning.

BACKGROUND

Attempts have been made to implement control systems for various types of physical systems having inputs or other control elements that a control system can manipulate in an attempt to provide desired output or other behavior of the physical systems—one example of such automated control is to manage electrical power generation operations of a group of power sources to support an electrical power load, potentially with ongoing changes in load and/or power generation capabilities. Such control systems have used various types of architectures and underlying computing technologies to attempt to implement such functionality.

However, various problems arise with existing control systems for systems that generate electrical power and other types of physical systems, including with managing uncertainty in a current state of a physical system being controlled and in how different types of inputs will affect operation of the physical system.

BRIEF DESCRIPTION OF THE DRAWINGS

FIG. 1A includes a diagram illustrating use of an automated control system to automatically and repeatedly control and improve ongoing operations of a target physical system, such as by using multi-particle modeling and reinforcement learning to learn effects of performing particular control actions in light of uncertain state information for the physical system.

FIGS. 2A-2C illustrate examples of performing techniques to automatically and repeatedly improve ongoing operations of a target physical system, such as ongoing electrical power production operations of a physical system that includes an electrical grid.

FIG. 3 is a block diagram illustrating example computing systems suitable for executing an embodiment of a system for performing automated control of one or more target physical systems in configured manners, including one or more components to automatically and repeatedly control and improve ongoing operations of a target physical system by multi-particle modeling and reinforcement learning.

FIG. 6 illustrates a flow diagram of an example embodiment of an MPRLO Control System routine.

FIG. 7 illustrates a flow diagram of an example embodiment of an MPRLO Control Action Manager Decision Module routine.

FIG. 9 illustrates a flow diagram of an example embodiment of a routine for a target system being controlled.

FIGS. 10A-10C illustrate graphical information for the described techniques.

DETAILED DESCRIPTION

Figure 1B:
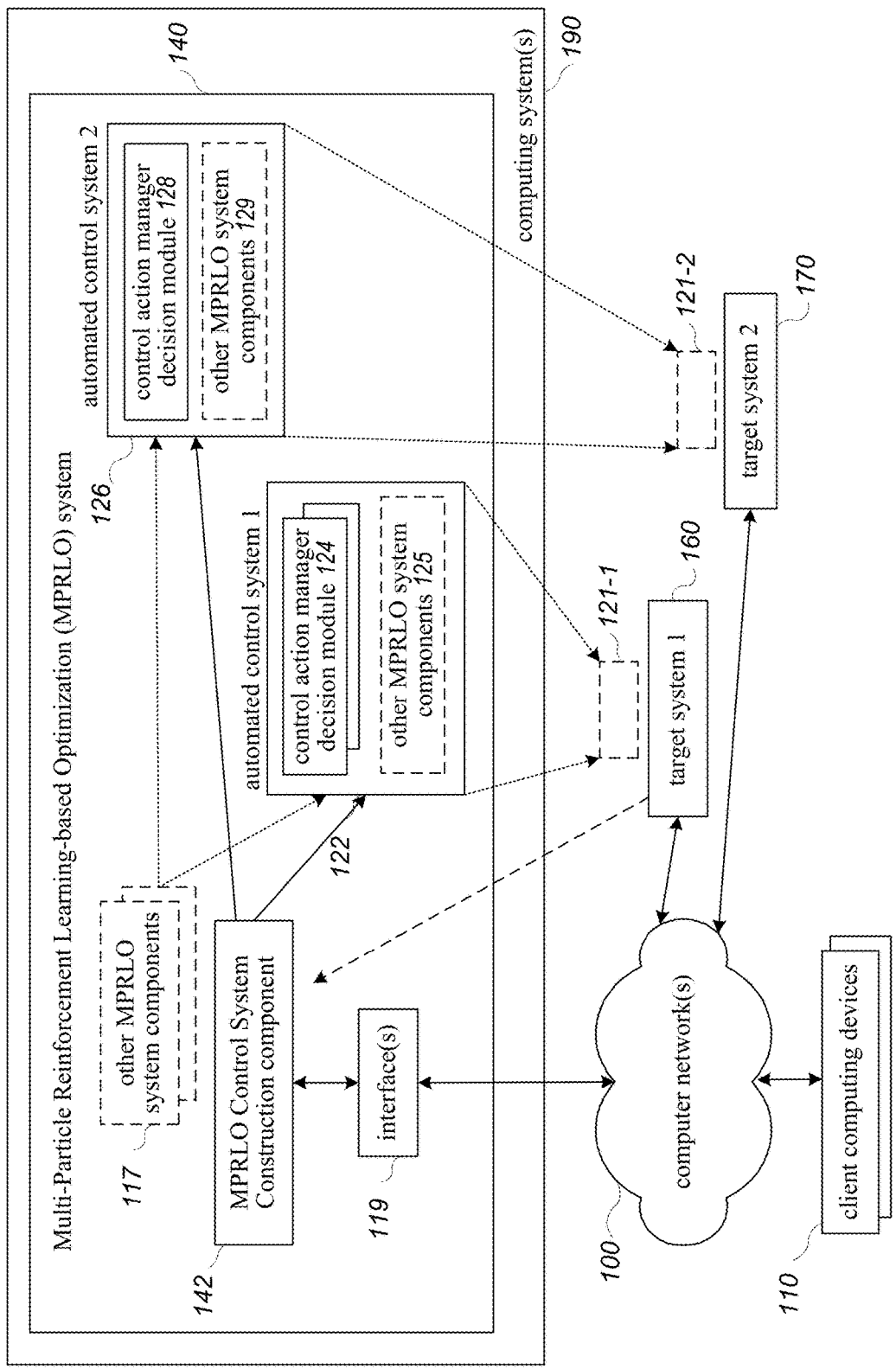
FIG. 1B is a network diagram illustrating an example environment in which a system for performing automated control of one or more target physical systems may be configured and initiated.

Techniques are described for implementing an automated control system that controls or otherwise manipulates at least some operations of a target physical system using a generated and repeatedly updated model of the target physical system, such as for a target physical system including an electrical grid having multiple producers of electrical power. In at least some embodiments, the described techniques include, as part of the control system using the model to determine and implement control actions to control operations of a physical system (e.g., determining how much power for each of multiple electrical producers to supply for each of a series of time periods in order to satisfy electrical power load that is projected for the time period, and implementing the determined power amounts via performing corresponding control actions), repeatedly performing automated modifications to the control system's ongoing operations to improve functionality for the target system in light of one or more defined goals (e.g., to allow regular maintenance activities or to otherwise satisfy one or more indicated goal criteria). For example, in at least some embodiments, the repeated automated modifications to the control system's operations during a sequence of multiple time periods may include, for each of the time periods, using reinforcement learning to iteratively optimize a plurality of particles that are generated for that time period to represent different state information within the physical system, in order to learn improved projected future state information that provides one or more possible solutions for satisfying the projected electrical power load during that time period while best meeting the one or more defined goals—in addition, after implementing one or more control actions for that time period that correspond to at least one of the possible solutions, the automated operations of the control system may further include updating the model of the physical system to reflect the implemented control action(s) and resulting actual state information gathered for the physical system, to enable the updated model to be used by the control system during a next time period. Additional details are described below related to performing such described techniques for repeatedly performing automated modifications to the control system's ongoing operations to improve functionality, and some or all of the described techniques are performed in at least some embodiments by automated operations of one or more control action manager decision module components controlling one or more specific target physical systems.

As noted above, the described techniques may in at least some embodiments include generating and using a model of a target physical system that is under control by encoding the dynamics of the target system (e.g., from sensory data and actions of the target system) in a function of the state of the target system referred to as a data Hamiltonian model, including in at least some embodiments and situations to update the model as additional information becomes available (e.g., as additional state information is obtained, to indicate further control actions that are performed, etc.)—in particular, the model is implemented in some embodiments as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function. In addition, some characteristics of the target system under control may not be completely known (e.g., internal state of one or more elements or components of the target system), with the data Hamiltonian encoding the currently known information, and the model may be used to determine control actions to implement in light of uncertainty associated with other unknown information about the target system. Such a data Hamiltonian may be implemented as a function that captures the flow and interdependence of a data domain, with behavior of the data Hamiltonian controlled at least in part by binary rules and optionally other non-binary rules that specify control actions to perform in light of current state information and one or more associated defined goals (e.g., binary absolute rules that characterize the unchanging physics of a physical target system being controlled and have binary true/false values; binary hard rules that characterize the desired behavior and goals and have binary true/false values; non-binary soft rules that characterize empirical knowledge of system operation, such as heuristic strategies and response to anomalies and learning strategies, and have variable, probabilistic truth values in a range [0,1], as well as associated confidence values; etc.). The control system may use the model and current state information as part of determining the control actions to currently perform, such as in a manner to satisfy defined constraints and other goals of the control system in light of its current state, while attempting to satisfy the requested output or other desired operation of the target system if possible. Additional details are included below regarding the generation and use of such target system models.

In at least some embodiments, a control system for a target physical system may perform automated operations to repeatedly and iteratively improve functionality of the target system in light of one or more defined goals. In particular, given a time period (e.g., ten minutes) in which one or more control actions are to be determined and implemented for a target physical system, a time window (e.g., less than the time period, such as five to nine minutes) may be selected in which to determine possible solutions to current requirements or preferences or other criteria so that one or more control actions corresponding to at least one such possible solution may be implemented for that time period. Given such a time window, multiple particles may be generated that each represents a different set of initial state information, and an iterative approach may be implemented during that time window in which the multiple particles are repeatedly modified and propagated during multiple iterations for that time window, in order to learn improved projected future state information for the particle, with reinforcement learning used to combine (or 'fuse') the information for the multiple particles after each iteration and to generate an accompanying updated gradient information to reflect a first-order derivative and Hessian information to reflect a second-order derivative. The propagation may include, for example, representing the criteria and constraints for the current model using a data Lagrangian model, and performing multi-particle optimization activities via iterative particle propagation and multi-particle fusion using reinforcement learning to attempt to learn improved projected future state information for the particle for a time window interval, with the optimization using a corresponding technique (e.g., a modified version of the Newton-Raphson optimization technique). After the last iteration, a 'best' control action to implement for the time period is determined for at least one of the identified possible solutions (e.g., a control action that satisfies the one or more defined goals better than the other possible control actions). Such automated modifications to the operations of the control system allows the control system to dynamically adapt to various changes that may occur in the target physical system over time (e.g., to changing state of the target physical system, to changes in responses of the target physical system to inputs, etc.). Additional details are included below related to performing the repeated, iterative improvements to the target physical system's functionality.

The described techniques may provide a variety of benefits and advantages. In particular, many traditional control system approaches have been ineffective for controlling complex systems in which internal state information cannot be determined and/or in which state information changes over time, while the use of the described techniques overcome such problems based at least in part by repeatedly improving the operation of the control system via feedback from ongoing operations and the iterative determination of improved solutions in light of current state information. Such traditional control system approaches typically involve the system designers beginning with requirements for behavior of a physical system, using the requirements to develop a static model of the system, and attempting to perform the run-time system operations in light of defined static specifications. Conversely, in at least some embodiments, the described techniques of a control state manager decision module do not need to use such static defined specifications, nor to develop such a resulting static model—instead, an idealized behavior of a physical system is expressed and used in such embodiments to create an idealized behavioral model (e.g., expressed as an idealized data Hamiltonian system model), and run-time operations repeatedly improve the functionality of the control system (e.g., continuously) by the iterative determination of improved solutions in light of current state information. Additional benefits and advantages are discussed elsewhere herein.

FIG. 1A includes an example diagram 195 illustrating how a control action manager decision module 195c of a control system 195a may be used to improve functionality while the control system is controlling a target physical system having one or more components or elements 195b—in at least some embodiments, the target physical system may include an electrical grid having multiple producers of electrical power, as discussed in greater detail elsewhere herein (including with respect to the examples of FIGS. 2A-2C), although in other situations the target physical system may be part of and/or include other elements whose operations are controlled by such a control system (e.g., an electrical vehicle, battery, solar panel, wind turbine, inverter, fuel cell, solid waste generator, motor, computing device, other active loads, etc.), whether in addition to or instead of an electrical grid.

In this example, the control system 195a performs a control loop to control ongoing operation of the target system, such as to drive the target system to a desired dynamic behavior. In particular, the control system may include or be implemented as an MPRLO (Multi-Particle Reinforcement Learning-based Optimization) decision module (as discussed in greater detail below with respect to FIG. 1B, as well as elsewhere herein), and include a generated model (not shown) of the target system. The generated target system model may, for example, be based in part on data obtained from actual operation of the target system over time and to include one or more of the following: some or all inputs supplied to the target system; resulting outputs from the target system, such as sensor data measured regarding operations of the target system from sensors 195d; rules that specify control actions to perform in light of current state information and one or more associated defined goals; etc. —in such situations, the target system model is a representation of the target system and its operations, and in this example is in the form of a total data Hamiltonian function $H_T$, as discussed in greater detail below. As part of the operation of the control system 195a, it receives information about projections for a time period (e.g., a next ten minute period) of demand for functionality of an indicated type from the physical system and of capacity and/or availability of such functionality from the target system, optionally to represent a request for a desired output or other desired operation of the target system, and uses information from its overall system model to determine one or more control actions to implement via one or more associated operations control signals (e.g., an energy supply control signal if the control system is satisfying a request for energy from one or more electrical power provider components of the target system, such as with an amount of energy to supply) sent to one or more components or elements of the target system—in particular, the one or more control actions may be selected or otherwise determined to satisfy defined constraints and other goals of the control system in light of its current state, while attempting to satisfy the desired output or other desired operation of the target system if possible. The one or more target physical system components or elements receive the control signal(s), and optionally provide a corresponding output 195f as appropriate, with that output and/or other characteristics of the target system being measured at least in part by the one or more sensors 195d (e.g., a suite of multiple passive sensors). The sensors 195d may further supply their measured readings to the control system 195a, such as to update corresponding state information in the target system model, with the control system 195a continuing to control operation of the target system for a next time period based on new received projected information for a next time period (e.g., in a continuous or substantially continuous manner, and such as based on a target system model that is updated in a continuous or substantially continuous manner based at least in part on readings from the sensors 195d).

As part of the determination of one or more control actions to implement for a time period, the control action manager decision module 195c of the control system 195a of FIG. 1A may repeatedly (e.g., continuously) improve functionality by performing multi-particle optimization activities via iterative particle propagation and multi-particle fusion using reinforcement learning to learn improved projected future state information values during a time window of the time period for a plurality of generated particles, to enable identifying one or more possible solutions to having the target system satisfy the demand for functionality for the time period. In particular, the control system may use one or more such possible solutions that are determined during the time window to identify one or more control actions to implement for the time period (e.g., in a remaining part of the time period after the time window), such as to make one or more modifications or other adjustments to operations of the target physical system to improve functionality (e.g., to affect how and whether particular components or elements of the target system provide functionality, such as via instructions provided to one or more respective target system component actuators). In the example of FIG. 1A, the physical system optionally includes one or more actuators 195e that receive the operations control signal from the control system and modify activities of the actuator(s) to dynamically regulate the behavior of corresponding components or elements of the target physical system, although in other embodiments the operation control signal(s) may instead be sent directly to a component or element of the target system (e.g., to a management or control interface of such a component or element), and/or the actuator(s) 195e may operate in other manners (e.g., provide a defined type of regulation until corresponding attributes are modified by the control system).

For example, if the target physical system includes an electrical grid with one or more producers of electrical power (e.g., in different physical locations), each producer may be represented by a different component to which one or more control actions for that producer are sent (e.g., instructions on how much electrical power to provide for the time period). Alternatively, if the physical system includes a battery device or other electrical power source device (e.g., a fuel cell, supercapacitor, etc.), the control system actuator(s) may include, for example, a DC-to-DC amplifier that is connected to the device and controls an amount of electrical current and/or voltage being output from the device, such as by providing a configurable amount of resistance—if so, the adjustments determined by the control system to the attributes or other state information of the actuator(s) 195e may include, for example, changing a level of resistance and/or an amount of time that a resistance level is used. If the target physical system includes, for example, an electrical grid with one or more producers or other providers of electrical power, the automated operations to control the target system may include using characteristics of such electrical power provider(s) in the target system to perform automated control of electrical power that is requested from and provided by the electrical power provider(s). In such embodiments, the automated operations of the control system may include generating an overall system model of performance of the electrical power provider(s) by receiving information about inputs to, outputs from, control signal instructions provided to and other attributes related to the one or more electrical power providers (e.g., projected electrical power capacity available from an electrical power provider during an indicated time period; projected electrical load or other electrical demand local to that electrical power provider during the indicated time period, such as for a subset of the overall electrical grid that is supported by that electrical power provider; past differences between projected and actual electrical power capacity and/or demand for one or more prior time periods; etc.), and using such information as part of modeling current operational characteristics of the one or more electrical power providers—given such modeled information, the control system may then use such information to make decisions on current and/or future control actions in a manner that reflects actual behavior of the target system. Alternatively, if the target physical system includes, for example, one or more batteries used to store and provide electrical power (e.g., for a local load, such as part of an electrical vehicle carrying the one or more batteries; for an electrical grid that supports various loads in various locations; etc.), the automated operations to control the target system may include using characteristics of at least one such battery in the target system to perform automated control of DC (direct current) power that is provided from and/or stored by that battery. In such embodiments, the automated operations of the control system may include generating an overall system model of battery performance by receiving information about inputs to, outputs from, control signal instructions provided to and other attributes related to the one or more batteries (e.g., electrical current and/or voltage being output for use, electrical current and/or voltage being input for storage, temperature readings external to the one or more batteries as part of their surrounding environment, etc.), and using such information as part of modeling current operational characteristics of the one or more batteries—given such modeled information, the control system may then use such information to make decisions on current and/or future control actions in a manner that reflects actual behavior of the target system. It will be appreciated that other types of physical systems may similarly be modeled and controlled.

In some embodiments, the control system may include or interact with an optional vectorization engine 195g that assists with the propagation of generated particles for a time window, such as by using one or more hardware GPUs (graphics processing units). For example, a scalar model of each particle may be provided, and a vectorized form for performing propagation of a particle may be provided to the vectorization engine 195g, which performs the propagation of each particle independently for an interval of a time window and returns information from the propagation for use in a next interval (or as a final result if the last interval), with reinforcement learning used to combine (or 'fuse') the information for the multiple particles after each iteration and to generate an accompanying updated gradient information to reflect a first-order derivative and Hessian information to reflect a second-order derivative.

Additional details are included below regarding the operations of the control state manager decision module of a control system. However, before further discussion of the control system and control state manager decision module and their functionality, a description of configuring and implementing such control systems is provided.

In particular, FIG. 1B is a network diagram illustrating an example environment in which one or more control systems that are each for performing automated control of one or more target physical systems may be configured and initiated. In particular, an embodiment of an MPRLO system 140 is executing on one or more computing systems 190, including in the illustrated embodiment to operate in an online manner and provide a graphical user interface (GUI) (not shown) and/or other interfaces 119 to enable one or more remote users of client computing devices 110 to interact over one or more intervening computer networks 100 with the MPRLO system 140 to configure and create one or more automated control systems each having one or more control action manager decision modules to use with each of one or more target systems to be controlled. For example, the MPRLO system 140 may include and use one or more control state manager decision modules in the example automated control system 1 122 and automated control system 2 126 for use in controlling operations of example target system 1 160 and example target system 2 170, respectively, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In addition, while each automated control system is described as controlling a single target system in the examples of FIG. 1B, other configurations may be used in other embodiments and situations, such as for a single automated control system to control multiple target systems (e.g., multiple inter-related target systems, multiple target systems of the same type, etc.), and/or for multiple automated control systems to operate together to control a single target system, such as by each operating independently to control different portions of that target control system. It will be appreciated that other configurations may similarly be used in other embodiments and situations.

In this example, the one or more users (not shown) may interact with the MPRLO system 140 to generate an example automated control system 122 for target system 1, with the automated control system 122 in this example including multiple control action manager decision modules 124 that will each control a subset of target system 1, such as to optionally each use a separate sub-model (not shown) of the overall target system model (not shown) of target system 1 that is used by the automated control system 122, and in some embodiments may cooperatively interact while controlling their respective subsets of the target system 1 when later deployed and implemented—in other embodiments and situations, such as that discussed with respect to automated control system 126 for target system 2, the control system may include a single control action manager decision module component that uses some or all of the overall target system model (not shown) of target system 2 that is used by the automated control system 126. In addition, the automated control systems 1 and 2 may each further optionally contain and use one or more other MPRLO system components, such as components 125 and 129 respectively, including in some embodiments and situations to include a coordinated control management component that manages interactions between multiple decision modules components of a control system, as discussed elsewhere herein.

The interactions of the users with the MPRLO system 140 to create the automated control system 122 may involve a variety of interactions over time, including in some cases independent actions of different groups of users. In addition, as part of the process of creating and/or training or testing automated control system 122, the MPRLO system 140 and/or automated control system 122 may perform one or more interactions with the target system 1 as illustrated, such as to obtain partial initial state information, although some or all training activities may in at least some embodiments include simulating effects of control actions in the target system 1 without actually implementing those control actions at that time. In some embodiments and situations, such initial user interactions may be used to generate the target system 1 model (and optionally multiple sub-models that each represents a different part of the target system 1 for which a respective one of the control action manager decision modules 124 will determine and implement control activities) included in the corresponding automated control system 122 and used to control operations of the target system 1, such as an initial rule-based overall system model of target system 1 that is based at least in part on binary rules and may be represented using a Hamiltonian function model as discussed elsewhere herein.

After the automated control system 122 is created, the automated control system may be deployed and implemented to begin performing operations involving controlling the target system 1 (e.g., by executing the automated control system 122 on the one or more computing systems 190 of the MPRLO system 140, so as to interact over the computer networks 100 with the target system 1; by executing one or more local copies 121-1 of some or all of the automated control system 122 in a manner local to the target system 1, such as one or more of the multiple decision modules 124 on one or more computing systems, not shown, that are part of or otherwise associated with the target system 1; etc.). Each such control action manager decision module may, for example, perform activities similar to those of control system 195a of FIG. 1A, such as with respect to a respective part of the target system 1 that is being controlled by that decision module, and in some embodiments and situations by using a sub-model of the generated system model that corresponds to that respective part of the target system (or by each using the overall target system 1 model). In addition, in embodiments and situations in which initial user interactions are used to generate an initial rule-based system model of a target system using binary rules, the initially deployed automated control system 122 may be based on such an initial rule-based system model, and data from the operation of the target system under control of that initially deployed automated control system 122 may be gathered and used to include information about current characteristics of the target system in a revised model of the target system, and/or the functionality of the control system may be improved and updated over time as discussed elsewhere herein.

In a similar manner to that discussed with respect to automated control system 122, one or more users (whether the same users, overlapping users, or completely unrelated users to those that were involved in creating the automated control system 122) may similarly interact over the computer network 100 with the MPRLO system 140 to create a separate automated control system 126 for use in controlling some or all of the target system 2 170. In this example, the automated control system 126 for target system 2 includes only a single control action manager decision module 128 that will participate in performance of all of the control actions for the automated control system 126, such as in a manner similar to that illustrated for control system 195a of FIG. 1A, and may further optionally contain and use one or more other MPRLO system components 129, as discussed elsewhere herein. The automated control system 126 may similarly be deployed and implemented for target system 2 in a manner similar to that discussed with respect to automated control system 122, such as on the one or more computing systems 190 and/or to execute a deployed copy 121-2 of some or all of automated control system 2 on one or more computing systems (not shown) that are part of or otherwise associated with the target system 2. It will be further appreciated that the automated control systems 122 and/or 126 may further include other components and/or functionality that are separate from the particular decision modules 124 and 128, respectively, although such other components and/or functionality are not illustrated in FIG. 1B.

The network 100 may, for example, be a publicly accessible network of linked networks, possibly operated by various distinct parties, such as the Internet, with the MPRLO system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the MPRLO system 140 in the illustrated embodiment is implemented in an online manner to support various users over the one or more computer networks 100, in other embodiments a copy of the MPRLO system 140 may instead be implemented in other manners, such as to support a single user or a group of related users (e.g., a company or other organization, such as if the one or more computer networks 100 are instead an internal computer network of the company or other organization, and with such a copy of the MPRLO system optionally not being available to other users external to the company or other organizations). In addition, the MPRLO system 140, each of its components (including component 142 and optional other components 117, such as one or more MPRLO Coordinated Control Management components), each of the control action manager decision modules, and/or each of the automated control systems may include software instructions that execute on one or more computing systems (not shown) by one or more processors (not shown), such as to configure those processors and computing systems to operate as specialized machines with respect to performing their programmed functionality.

As noted above, various types of data may be obtained and used as part of modeling operational characteristics of a target system in a general overall model, including information about prior input data to the target system and resulting behavior of the target system. In some embodiments and situations, such data may include data that is gathered in an automated manner from one or more types of hardware sensors, and in some embodiments and situations, such data may include information about and/or from one or more human users. The term "sensor" and "sensor data" as used herein generally refers to such data regardless of source or type, including data from hardware sensors, unless otherwise indicated with respect to a particular situation. In addition, the improvements to automated control system functionality that are performed by a control state manager decision module may in at least some embodiments be performed to complete or repair or otherwise address conflicts in state information for one or more parts of the target system, such as from lack of sufficient internal state structure information or other information, and to enable learning of or other improvements to results of performing control actions.

While not illustrated in FIG. 1B, the distributed nature of operations of automated control systems such as those of 122 and 126 allow partially decoupled operations of the various decision modules, including to allow modifications over time to the group of decision modules 124 or the decision module 128 while the automated control system 122 or 126 respectively is in use, such as to add new decision modules 124 and/or to remove existing decision modules 124, or to replace decision module 126. In a similar manner, various changes may be made to such automated control systems and/or their overall system models, such as to change rules or other restrictions and/or to change goals over time, with a new corresponding model being generated and deployed, including in some embodiments and situations while the automated control system continues to control operations of a corresponding target system.

As noted above, in at least some embodiments, the model of a target system to be controlled is encoded as a data Hamiltonian model, which in some embodiments is a function of three types of variables (state variables, momentum variables and control variables), and is composed of three additive elements (the physical model, the constrained model and the learned model). The physical and constrained models may be determined respectively by the physical principles characterizing the system and operational requirements. In particular, the three types of variables used in the function for the data Hamiltonian model include a vector defining the state of the physical system, a vector defining the momentum of the physical system, and a vector of action variables that control the physical system. The additive elements that compose the data Hamiltonian model include at least Hamiltonians $H_O$ and $H_C$, where $H_O$ is the physical Hamiltonian of the physical system, $H_C$ is the constrained Hamiltonian representing the known operational and requirement constraints, and with the total Hamiltonian model in the following form: $H_T=H_O+H_C$, where $H_O$ and $H_C$ are determined from stored operational rules and historical data of the physical system. The total Hamiltonian model $H_T$ has the same properties of the Hamiltonian of classic mechanics, but adapted to the operations of particular types of physical systems. In addition to the total Hamiltonian model $H_T$ that characterizes the dynamic target system, a control system implemented by the described techniques may in some embodiments use a specified desired behavior Hamiltonian $H_D$, which reflects the desired behavior of the system under control, and affects the dynamics of the control signal produced by the control system. The total Hamiltonian model $H_T$ encodes the evolution of the physical system under control, with the evolution represented in the form of the extended Hamilton Jacobi equations, as follows:

$$\frac{dq(t)}{dt} = \frac{\partial H_T}{\partial p(t)}$$

$$\frac{dp(t)}{dt} = -\frac{\partial H_T}{\partial q(t)}$$

$$\frac{du(t)}{dt} = -\Gamma * \frac{\partial}{\partial u}\left(\frac{d(H_T - H_D)^2}{dt}\right)$$

where q(t) is the state vector of the physical system being learned, p(t) is their momentum, and u(t) is the control action vector. The first two equations are classic evolution equations of the dynamics of the dynamic target system, and the last equation describes control of the physical system to satisfy constraints and approximate the desired behavior represented by $H_D$. The parameter $\Gamma$ is an empirical parameter to enhance stability of the control system.

In at least some embodiments, initial modeling of a state of a target physical system is performed using one or more data Hamiltonian functions, and the described techniques include using one or more types of sensor data to improve functionality of the control system during its operation. A control system controlling such a target system may, in at least some embodiments and situations, implement multiple MPRLO control action manager decision modules or subsystems to distribute the control and management through a network with synchronization via a mean field Hamiltonian approach, such as with each decision module characterized by a data Hamiltonian sub-model that defines the dynamics and interaction of one or more corresponding components in the target system, and with each such data Hamiltonian sub-model of a decision module being dynamically computed from sensory data and actions. Such a data Hamiltonian sub-model (for a single target system component or element) and/or an aggregated mean field Hamiltonian model (for multiple coordinated target system components) can be thought of as a mathematical function that helps navigate a query through huge bodies of information by defining a spectrum of possible outcomes, including to model history, current situation and possible options. Non-exclusive example embodiments using such techniques are further described herein, but it will be appreciated that other embodiments may differ in one or more manners from these example embodiments.

A data Hamiltonian may be implemented as a function that captures the flow and interdependence of a data domain, and a control action manager decision module may be implemented as an optimization-based engine operating in a data domain that belongs to a multi-data domain, with decision module optimization functionality encoded in the decision module's Hamiltonian model to use a formal, distributed rule-based process for resolving time-based queries from a distributed decision module-based domain in real-time. In some embodiments, a control action manager decision module's model (or sub-model) may be implemented using Horn clause rules of three types, as follows: absolute rules that characterize the physics of a target physical system being controlled (or otherwise describe unchangeable rules in other types of target systems), and have truth value equal to true in any Hamiltonian realization (e.g., a value of 0 for false or 1 for true); hard rules that characterize the desired behavior and goals, and have truth value equal to true in any Hamiltonian realization (e.g., a value of 0 for false or 1 for true); and soft rules that characterize the empirical knowledge of the operation, heuristic strategies, economic dispatch, and response to anomalies and learning strategies, and have a variable, probabilistic truth value in [0,1], as well as an associated confidence value for that variable, probabilistic truth value in some embodiments. Meta-rules that are special kinds of soft rules may be used to transform sensory data and desired behavior into constraint data Hamiltonians. Soft rules can be thought of as being used to navigate queries through "gradients" (information that is neither true nor false), as a means of identifying what areas of data are pertinent to any given query. Conversion of constraints for a control action manager decision module's model (or sub-model) may include the following: transform truth values {0,1} to a [0,1] interval; transform variables and parameters to continuous variables and parameters; transform absolute rules to equality constraints; transform hard rules to equality constraints; transform soft rules to inequality constraints; transform inclusion sets to functional forms; transform algorithms to differential equations; etc.

Some further aspects of performing automated operations to control a target system with one or more batteries and/or other types are target systems are included in U.S. patent application Ser. No. 15/096,091, filed Apr. 11, 2016 and entitled "Using Battery DC Characteristics To Control Power Output"; and in U.S. patent application Ser. No. 15/410,647, filed Jan. 19, 2017 and entitled "Using Sensor Data To Assist In Controlling A Target System By Modeling The Functionality Of The Target System", which claims the priority benefit of U.S. Provisional Patent Application No. 62/336,418, filed May 13, 2016 and entitled "Using Sensor Data To Assist In Controlling A Target System By Modeling The Functionality Of The Target System"; and in U.S. patent application Ser. No. 16/103,788, filed Aug. 14, 2018 and entitled "Using Battery State Excitation To Control Battery Operations"; and in U.S. patent application Ser. No. 17/356,965, filed Jun. 24, 2021 and entitled "Using Active Non-Destructive State Excitation Of A Physical System To Model And Control Operations Of The Physical System", which is a continuation-in-part of U.S. patent application Ser. No.

16/289,602, filed Feb. 28, 2019 and entitled "Using Battery State Excitation To Model And Control Battery Operations", which claims the priority benefit of U.S. Provisional Patent Application No. 62/796,581, filed Jan. 24, 2019 and entitled "Using Battery State Excitation To Model And Control Battery Operations"; and in U.S. patent application Ser. No. 16/276,545, filed Feb. 14, 2019 and entitled "Controlling Ongoing Battery System Usage Via Parametric Linear Approximation"; and in U.S. patent application Ser. No. 16/656,571, filed Oct. 17, 2019 and entitled "Controlling Ongoing Usage Of A Battery Cell Having One Or More Internal Supercapacitors And An Internal Battery"; each of which is hereby incorporated by reference in its entirety.

Some further aspects of implementing such techniques for modeling target systems and performing automated operations to control such target systems, including in a distributed manner using multiple decision modules, are included in U.S. patent application Ser. No. 14/746,738, filed Jun. 22, 2015 and entitled "Cooperative Distributed Control Of Target Systems"; in U.S. Patent Application No. 62/182,968, filed Jun. 22, 2015 and entitled "Applications Of Cooperative Distributed Control Of Target Systems"; in U.S. Patent Application No. 62/182,796, filed Jun. 22, 2015 and entitled "Gauge Systems"; and in international PCT Patent Application No. PCT/US2015/037022, filed Jun. 22, 2015 and entitled "Cooperative Distributed Control Of Target Systems"; each of which is hereby incorporated by reference in its entirety.

For illustrative purposes, some embodiments are described herein in which specific types of data are gathered and used in particular manners to perform specific types of control actions for specific types of target systems (e.g., physical systems that include an electrical grid), including via particular types of adjustments to improve particular types of functionality, and via use of particular types of techniques (e.g., multi-particle reinforcement learning-based optimization) as part of determining particular control actions to perform. However, it will be understood that such described techniques may be used in other manners in other embodiments, including with other types of target systems and other types of techniques, and that the invention is thus not limited to the exemplary details provided.

Figure 2A:
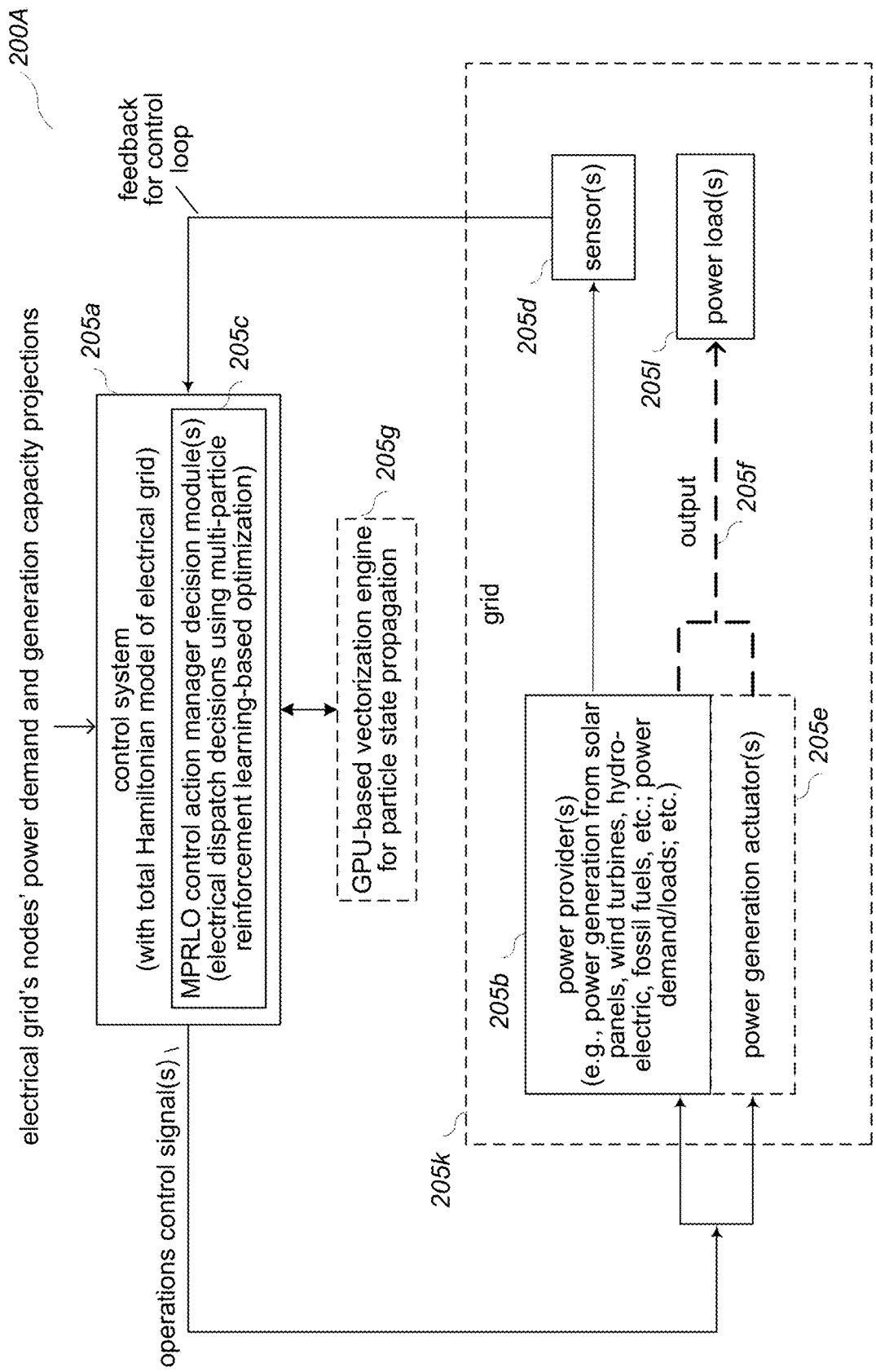
Figure 2B:
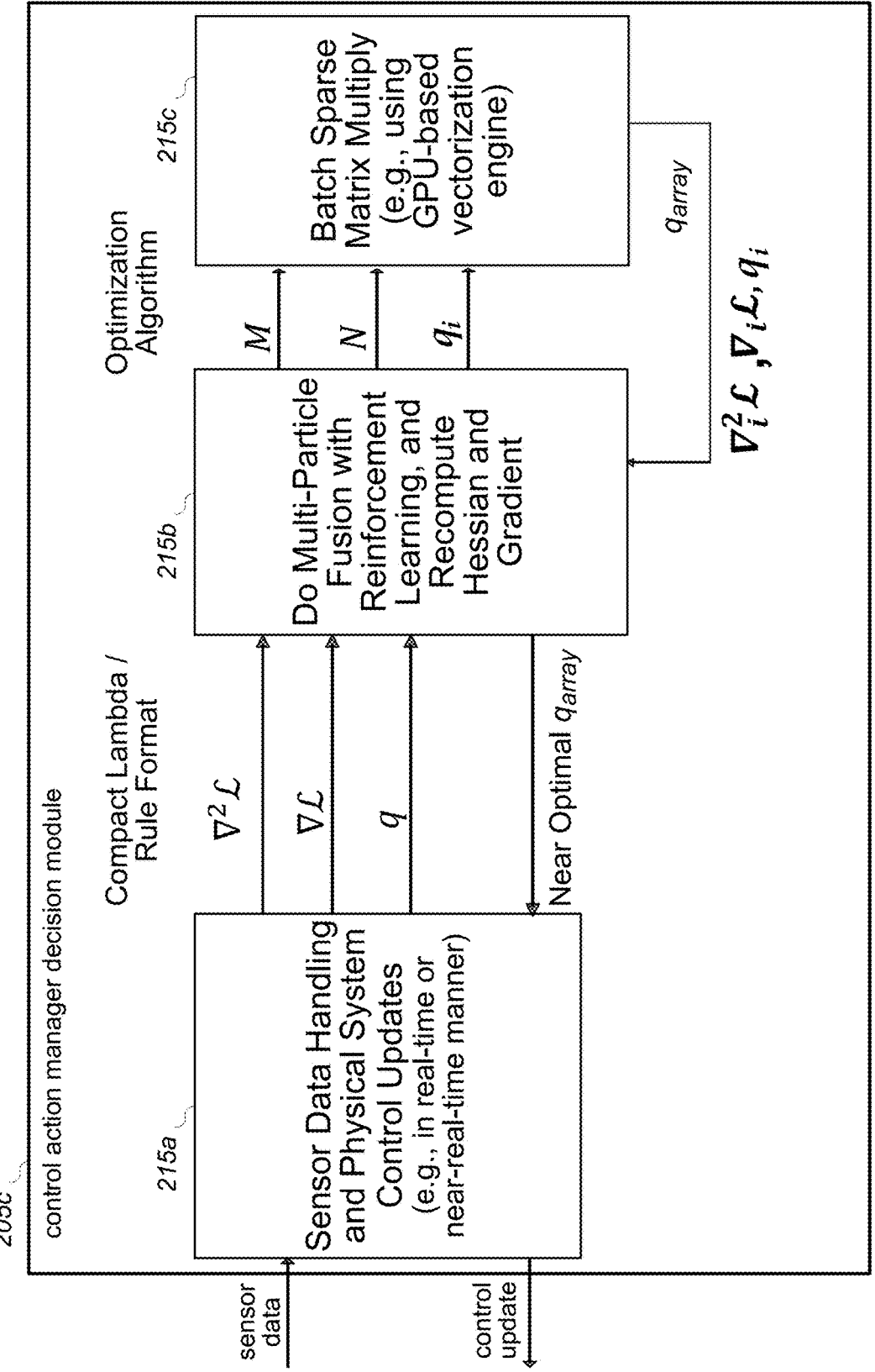

Turning now to FIGS. 2A-2C, these figures illustrate examples of a control action manager decision module component performing techniques to improve functionality of a control system for a target physical system that includes an electrical grid, by repeatedly performing automated modifications to the control system's ongoing operations to improve functionality for the target system in light of one or more defined goals, including to use reinforcement learning to iteratively optimize a plurality of particles that are generated for a time period to represent different state information within the physical system in order to learn one or more possible solutions corresponding to improved projected future state information, for use in satisfying the projected electrical power load during that time period while best meeting the one or more defined goals.

In particular, FIG. 2A has similarities to FIG. 1A, but further illustrates information 200A about the use of a control state manager decision module 205c of control system 205a to improve functionality in controlling use of an electrical grid 205k with one or more electrical power providers 205b and one or more components or elements 205l that provide electrical load—elements such as sensors 205d (e.g., one or more of a voltmeter, ammeter, power meter, one or more temperature sensors, etc.) and optional vectorization engine 205g operate in a manner analogous to those of corresponding elements 195d and 195g of FIG. 1A. A non-exclusive example of such a type of system is an electrical grid with multiple commercial producers of electrical power and optionally also small home and/or businesses that generate electrical power (e.g., excess electrical power at times from renewable power sources), while another non-exclusive example is a micro-grid having one or more home or business electrical power systems that may optionally include electrical generation sources (e.g., solar panels, wind turbines, etc.) as well as electrical load from the home(s) or business(es).

Various actions may be performed to control operations of the target physical system of FIG. 2A according to one or more defined goals in light of defined constraints, rules and other information, as discussed elsewhere herein, including based on a current total Hamiltonian model (not shown) of the target system. In some embodiments, the automated activities to control the target system may be performed in a real-time manner and/or to satisfy requests for power while maximizing or optimizing operations of the target system in light of one or more defined goals (e.g., to allow regular maintenance activities, to reduce monetary costs or operational problems such as downtime, to satisfy one or more other indicated goal criteria, etc.) or with respect to other defined criteria. In addition, the control commands sent from the control system 205a to the power providers 205b and/or associated power generation actuators 205e may have various forms in various embodiments, such as related to a power level for each power provider to provide—non-exclusive examples of such control commands may include a particular electrical power amount to provide, an instruction or request to increase or decrease the power being output by a specified amount, an instruction or request to not change the power output, etc. (e.g., to set a battery to charge or discharge for the time period, to specify a percentage of supplied power for the time period to be provided from one or more diesel generators, to purchase power from a utility or other external source for the time period, to sell power to a utility or other external consumer for the time period, etc.). While not illustrated in the example of FIG. 2A, in other embodiments the operations of the control system may include implementing control actions that direct or request one or more entities or components causing power load 205l to reduce or otherwise change their power load in light of available electrical power (e.g., to specify an air conditioning chiller load setting for the time period, etc.), whether instead of or in addition to implementing control actions that direct or request one or more of the power providers 205b to increase or otherwise change an amount of electrical power provided—in addition, in some embodiments a particular component or entity may act as both a power provider 205 and a power load 205l (e.g., as part of a smaller sub-grid within the overall electrical grid).

In the illustrated embodiment, the control action manager decision module performs automated operations to repeatedly and iteratively improve functionality of the target physical system in light of one or more defined goals. For example, given a time period (e.g., ten minutes) in which one or more control actions are to be determined and implemented for the target system, a time window (e.g., less than the time period, such as five to nine minutes) may be selected in which to determine possible solutions to current requirements or preferences or other criteria so that one or more control actions corresponding to at least one such possible solution may be implemented for that time period. Given such a time window, multiple particles may be generated that each represents a different set of state information, and an iterative approach may be implemented during that time window in which the multiple particles are repeatedly modified and propagated, in order to determine improved projected future state information for each of at least some of the particles. Each particle contains state information for all devices of the physical system for all time period of the forecast time horizon (e.g., the next four hours). The propagation may include, for example, representing the criteria and constraints for the current model using a data Lagrangian model, and performing multi-particle optimization activities via iterative particle propagation and multi-particle fusion using reinforcement learning to attempt to learn improved state information for the particle for a time window interval, with the optimization performed using a corresponding technique (e.g., a modified version of the Newton-Raphson optimization technique). The resulting 'near optimal' particle contains projected future state information for each device, for each time period of the forecast horizon, with the initial future state information for the first time period at the beginning of the forecast giving near optimal control variables for the next time period. If the forecast were to remain accurate for the forecast horizon, the control variables for the various projected future states for the various time periods in the forecast horizon would be valid for the remainder of the forecast.

The reinforcement learning may be used to facilitate the particle fusion. In particular, the modified Newton Raphson method uses a gradient (first order derivative) and hessian (second order derivative) to improve the state information of the particles. The modified Newton Raphson implements a recursive computation that approximates the inverse asymptotically, with the convergence of the recursion being quadratic. Speedup efficiencies may be achieved by using multiple particles (e.g. implementing the same algorithm, but with different initial conditions) running in parallel, with the individual particle propagation being independent at the numerical level. The multi-particle processing may improve the rate of convergence proportional to the number of particles, with the overall convergence being improved by combining the results of the multiple particles using reinforcement learning procedure, so as to provide improved initial state information (e.g., improved initial conditions) to generate numerically better outcomes from each particle. The multi-particle processing for a time period ends when the time window for that time period is reached or the distribution of improved state information answers compared with the initial state information via Kullback Leibler entropy gives a constant entropy. For example, for each particle and each iteration, the Hamiltonian of the particle can be calculated, and if the Hamiltonian remains relatively constant (e.g., differs from a prior Hamiltonian by at most a defined threshold), then the particle propagation is improving a feasible solution, while otherwise the particle may be eliminated or otherwise removed. Additional details related to the operations of the control action manager decision module are discussed with respect to FIGS. 2B-2C and elsewhere herein.

With respect to an initial model of the electrical grid that is used by the control system 205a, it may in some embodiments be a generic model that is applicable to any type of electrical grid, while in other embodiments an initial model may be used that is specific to a type of the electrical grid, while in yet other embodiments an initial model may be used that is designed and/or configured specifically for the particular electrical grid in use. Thus, such an initial model that is initially employed in a particular system with a particular electrical grid may be updated over time, such as to reflect improvements from determinations of the control action manager decision module and/or resulting sensor values after corresponding changes are made—when updating a model to reflect a particular electrical grid and/or system, the updating operations may in some embodiments be performed initially in a learning phase before using the automated control system to control the electrical grid, and/or in some embodiments may be performed continuously or periodically while the automated control system is controlling the electrical grid (e.g., to reflect changes over time). Additional details are included elsewhere herein regarding such models, including their construction and use.

In addition, in some embodiments the control system may be implemented as multiple separate components, such as with a controller sub-component implemented in whole or in part in hardware and/or firmware and that optionally is at a location of a particular target system component or element, (e.g., at a particular electrical power provider, at a particular electrical load generator, etc.) and with other portions of the control system implemented in part by software instructions executing on one or more computing systems that are optionally remote from those one or more locations and communicating with one or more such controller sub-components over one or more intervening computer networks, while in other embodiments the control system may be implemented as a single component (whether at a location of the electrical grid or remote from it). Similarly, while in some embodiments the control system and control action manager decision module component may be implemented as separate components, in other embodiments the control system and control action manager decision module component may be implemented as a single component that performs some or all of the activities of both the control action manager decision module component and control system. In addition, while not illustrated with respect to FIG. 2A, multiple electrical power providers and/or generators of electrical load (e.g., tens, hundreds, thousands, millions, etc.) may in some embodiments each have an associated control action manager decision module that controls actions of that component or element in a similar manner, and with the various components and/or elements acting together in a coordinated manner to perform aggregate control of the electrical grid.

FIGS. 2B and 2C continue the example of FIG. 2A, with FIG. 2B providing additional details 200B about example data flow for activities of the control action manager decision module component 205c discussed with respect to FIG. 2A, and with FIG. 2C providing additional details 200C about performance of the multi-particle reinforcement learning-based optimization activities of the control action manager decision module component 205c discussed with respect to FIG. 2A.

In the example of FIG. 2B, the control action manager decision module 205c performs activities 215a to receive sensor data related to a current state of the target physical system and information about control actions performed (e.g., a last set of one or more control actions for a prior time period), and to provide updated information (e.g., one or more control actions to perform for the current time period), such as in a real-time or near-real-time manner (e.g., within a time period in which control action decisions are needed). For example, given a time period (e.g., ten minutes) in which one or more control actions are to be determined and implemented for the target system, a time window (e.g., less than the time period, such as five to nine minutes) may be selected in which to determine possible solutions to current requirements or preferences or other criteria so that one or more control actions corresponding to at least one such possible solution may be implemented for that time period. In the illustrated example, multiple particles may be generated that each represents a different set of state information q, and an iterative approach may be implemented during that time window using activities 215b and 215c in which the multiple particles are repeatedly propagated, modified, and then combined (or 'fused'). In the illustrated example, the activities 215b receive the state information q and initial gradient information ∇L to represent a first-order derivative and an initial Hessian approximation $\nabla^2$ L to represent a second-order derivative. The activities 215b and 215c then do the iterative multi-particle propagation, modification and fusion, including performing a sparse matrix multiplication in the current example (e.g., in a batch mode using a GPU-based vectorization engine, such as based on Clifford algebra and ensemble averaging) in order to get improved state information $q_i$ for at least some particles for iteration i and corresponding updated Hessian approximations and gradient information for those particles for that iteration, with the process repeating until the time window ends or other criteria are satisfied (e.g., one or more possible solutions are determined to current requirements or preferences or other criteria), resulting in near-optimal state information being produced, so that one or more control actions corresponding to at least one determined possible solution may be implemented for that time period. With respect to FIG. 2B, the sparse matrix contains the symbolic expressions that describe the system, with the compact lambda/rule being a format to define the symbolic expressions (e.g., using python sympy expressions, and optionally converted to a binary format for transfer efficiency if being sent to a vectorization engine).

In the example of FIG. 2C, the control action manager decision module 205c illustrates further details 215d regarding how each particle is separately and independently updated before the subsequent particle fusion is performed for use in a next iteration (if any), such as to reflect at least some of the activities 215b and 215c of FIG. 2B, with additional details 215e to visually illustrate a visual example of the state of the multi-particle reinforcement learning coupled with all the particle solutions to extract initial conditions for the next iteration for each particle. In the visual example, W is the generic transition of the reinforcement learning algorithm between the particle i and particle j, for i and j running over the number of particles.

In some embodiments, particle propagation and modification is implemented using an inverse Hamiltonian algorithm, with the equation below being vectorized and solved iteratively (e.g., one sensor at a time algebraically to obtain a Hamiltonian function representing the target system), and with the control action manager decision module being referred to at times as a 'data tomograph' or 'agent' or 'automaton'.

$$\left(\frac{\partial^2 \Delta H_i}{\partial t \partial p_k}\right)^T + \sum_j \left(\frac{\partial^2 \Delta H_i}{\partial x_j \partial p_k}\right)^T \left(\frac{\partial \Delta H_i}{\partial p_j}\right)^T - \left(\frac{\partial^2 \Delta H_i}{\partial p_j \partial p_k}\right)^T \left(\frac{\partial \Delta H_i}{\partial x_j}\right)^T =$$

$$\left(\frac{\partial \Psi_k(t, x, p)}{\partial x_k}\right)^T \left(\frac{\partial \Delta H_i}{\partial p_k}\right)^T - M_k^i \dot{Y}_k$$

k=1, ..., n
where: $Y_k$ is the signal associated with the kth sensor
$\Delta H_i$ is the data tomograph Model update estimate due to activeby the tomograph of the ith agent $M_k^i$ is the influence matrix of kth sensor on the ith Hamiltonian Corrected Hamiltonian:

$$H_i^+(\ )=H_i(\ )+\Delta H_i(\ )$$

In some embodiments, the particle fusion includes performing the equation below $$\underset{\substack{Y \\ \downarrow \\ \text{Automaton} \\ \text{Model Equation} \\ \text{Repository}}}{Y} = \underset{\substack{E \\ \downarrow \\ \text{Inference}}}{E} \underset{\substack{\circ \\ \text{Apply}}}{\circ} \underset{\substack{Y \\ \downarrow \\ \text{Matrix}}}{Y} + \underset{\substack{T \\ \downarrow \\ \text{Union}}}{T}_{\text{Goal}}$$

In particular, at stage k=0, and assuming a horizon {0,n}, the state of the algorithm is given by the following Dynkin sequence:

$$Y_0(\{u_i,x_i\})=\{p_{i-1}=P_iq_i,q_i=R_ip_i,i=1,\ldots,n\}$$

During the execution of the algorithm, some of the equational terms are instantiated with values to some of the model fractions. The resulting equational terms are added together to form the equational states $$Y_l(\{u_i,x_i\}) \text{ at a later stage } l \geq 0.$$

The activities may include representing the target system model during the iterations as a function equational form defined by the Dynkin operators, resulting in a data Hamiltonian Jacobi Propagator, using the following:
Inference Automaton Evolution:
Super set $q_t=\{P_t,R_t\}$ Contains sets of Dynkin's sequences of equations
$Y_k=E(q_t)\bullet Y_k+K(q_t)$ Partial Inference Automaton implementation
$\omega_{t,t+\Delta}=\hat{u}(Y_k)=u_k(y)$ Partial Control Model Generation: $\hat{u}$ assigns values in the equational forms $Y_k$
t=1, 2, ..., n, ...,
$\omega_{t,t+1}$ Current Model approximation Given partial Model resolution $$q_{t+1} = \begin{cases} \delta(q_t, \omega_{t,t+1}) & \text{Equational transition of the automaton} \\ q_N & \text{Transition if terminal of the automaton} \end{cases}$$

$q_N$ is terminal if the Dynkin equations do not contain Unassigned Variables
In order to construct the inference matrix E in terms of the Dynkin operators, the following may be used:
Theorem:
The state transition of the Inference automaton DP recursion $$Y_{S,S'}(k) = \sum_{S'',S'''} E_{S,S',S'',S'''}(k) Y_{S'',S'''}(k) + T_{S,S'}(k)$$

$$E_{S,S',S'',S'''}(k) = \sum_{\alpha,\beta} (W_{\alpha,\beta}(k))_{S,S'} (W_{\alpha,\beta}(k))_{S'',S'''}^T S, S', S'', S''' \in S$$

With
$W_{\alpha_k,\beta_k}(k)=(P_{k-1}R_k)_{\alpha_k,\beta_k}$, k=1, ..., n−1, α,β∈ S, and $P_{k-1},R_k$ are the Dynkin operators
The entries of E Can be map into Model Fractions between successive states:

$$E_{S,S',S'',S'''}(k)=E_{u,u}(k)$$

where
S,u(k−1),S',u(k), S'',u(k+1),S''' is a successful path in IA, and an optimal fragment of the Desired model
Complexity: O(n log(n)m log(m+1))*1

The solution of the equation can be determined if it is "Lyapunov stable" and the domain has quasi-regular convergence, as follows:

$$Y = E \circ Y + T$$

Iteration to IA equation $$Y_{k+1} = E \circ Y_k + T$$

$$Y_1 = E \circ Y_0 + T$$

$$Y_2 = E \circ Y_1 + T = E^2 \circ X_0 + E \circ T + T$$

$$\vdots$$

$$Y_N = E^N \circ Y_0 + \sum_{n=0}^{N-1} E^n \circ T$$

$$\omega = S(Y_N) = u_N(y) \text{ let}$$

$$E^* = \sum_{n=0}^{\infty} E^n \text{ as}$$

$$N \to \infty : \underset{\text{Lyapunov Stability}}{E^N \to 0}, \underset{\text{Contraction Mapping}}{Y_N \to T}, \Rightarrow Y = \underset{\text{Quasiregular Convergence}}{E^* \circ T}$$

A Newton-Raphson optimization procedure may be performed for the particles, as follows:

$$\min_{q_1, \ldots, q_v} \mathcal{L}(q^{*(1)}, \ldots, q^{(v)})$$

$$\nabla \mathcal{L}(q(t)) = \begin{bmatrix} \frac{\partial \mathcal{L}}{\partial q^{(1)}} \\ \vdots \\ \frac{\partial \mathcal{L}}{\partial q^{(v)}} \end{bmatrix} = \begin{bmatrix} \nabla \mathcal{L}_1 \\ \vdots \\ \nabla \mathcal{L}_v \end{bmatrix} = 0, \text{ Necessary Conditions}$$

with positive semi definite Hessian matrix $$\nabla^2 \mathcal{L}(q) = \begin{bmatrix} \frac{\partial^2 \mathcal{L}}{\partial q^{(1)} \partial q^{(1)}} & \cdots & \frac{\partial^2 \mathcal{L}}{\partial q^{(1)} \partial q^{(v)}} \\ \vdots & \ddots & \vdots \\ \frac{\partial^2 \mathcal{L}}{\partial q^{(v)} \partial q^{(1)}} & \cdots & \frac{\partial^2 \mathcal{L}}{\partial q^{(v)} \partial q^{(v)}} \end{bmatrix} = \begin{bmatrix} \nabla^2 \mathcal{L}_{11} & \cdots & \nabla^2 \mathcal{L}_{1v} \\ \vdots & \ddots & \vdots \\ \nabla^2 \mathcal{L}_{v1} & \cdots & \nabla^2 \mathcal{L}_{vv} \end{bmatrix} \geq 0.$$

We have the Newton iteration $$q_{(k+1)} = q_{(k)} - (\nabla^2 L(q_{(k)}))^{-1} \nabla L(q_{(k)})(**)$$

Figure 10A:
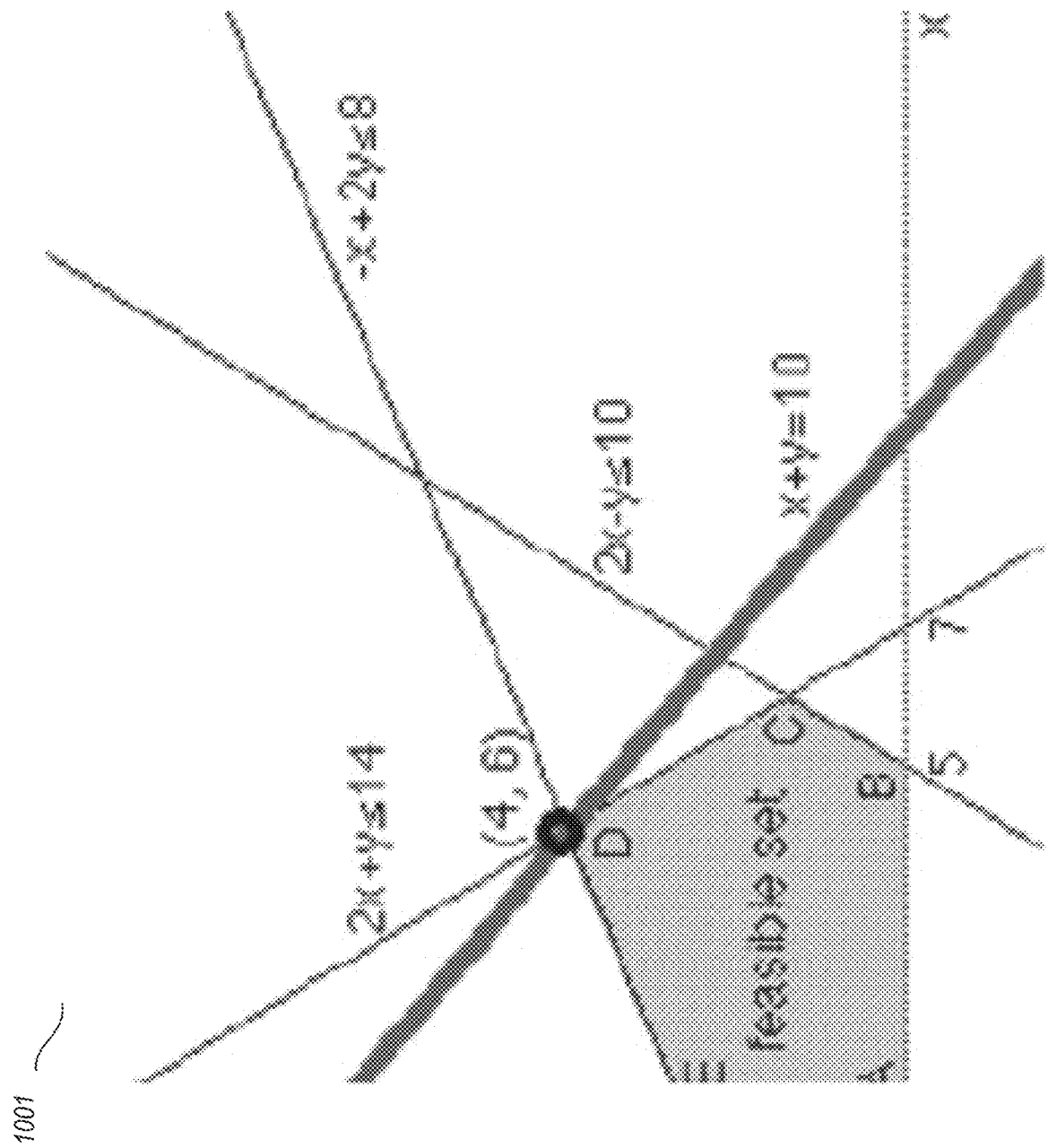

As part of doing so, the rules may be translated to potentials, as follows:
Hard rules: Potential is 0
Soft rules: Potential is between 0 and 1, inclusive
Absolute rules: Potential is 0 or 1
$R_{hard}(q_{in}, q_{ini})$, T=1 i=1 . . . n
$R_{soft}(q_{jn}, q_{jnh})$, 1≥T≥0
$R_{absolute}(q_{jn}, q_{jnj})$, T=0 or 1
Creates interior point
and as shown in information 1001 of FIG. 10k
From the rules, an interior point Lagrangian is constructed, as follows:

$$\mathcal{L}(q^{(1)}, \ldots, q^{(v)}) \quad \text{1)}$$

$$\frac{\partial \mathcal{L}}{\partial q} = \begin{bmatrix} \frac{\partial \mathcal{L}}{\partial q_1} \\ \vdots \\ \frac{\partial \mathcal{L}}{\partial q_v} \end{bmatrix} = 0 \quad \text{2)}$$

$$\nabla^2 \mathcal{L}_{ij}(\text{Polynomial})$$

$$\nabla^2 \mathcal{L}(q) = \begin{bmatrix} \frac{\partial^2 \mathcal{L}}{\partial q^{(1)} \partial q^{(1)}} & \cdots & \frac{\partial^2 \mathcal{L}}{\partial q^{(1)} \partial q^{(v)}} \\ \vdots & \ddots & \vdots \\ \frac{\partial^2 \mathcal{L}}{\partial q^{(v)} \partial q^{(1)}} & \cdots & \frac{\partial^2 \mathcal{L}}{\partial q^{(v)} \partial q^{(v)}} \end{bmatrix} = \begin{bmatrix} \nabla^2 \mathcal{L}_{11} & \cdots & \nabla^2 \mathcal{L}_{1v} \\ \vdots & \ddots & \vdots \\ \nabla^2 \mathcal{L}_{v1} & \cdots & \nabla^2 \mathcal{L}_{vv} \end{bmatrix} \geq 0.$$

$$q_{(k+1)} = q_{(k)} - Q_l(k) \nabla \mathcal{L}(q_{(k)})$$

$$Q_{l+1}(k) =$$

$$Q_l(k) - (\nabla^2 L(q_k^1, \ldots, q_k^n))^T \nabla^2 L(q_k^1, \ldots, q_k^n) Q_l(k) + (\nabla^2 L(q_k^1, \ldots, q_k^n))^T$$

Figure 10B:
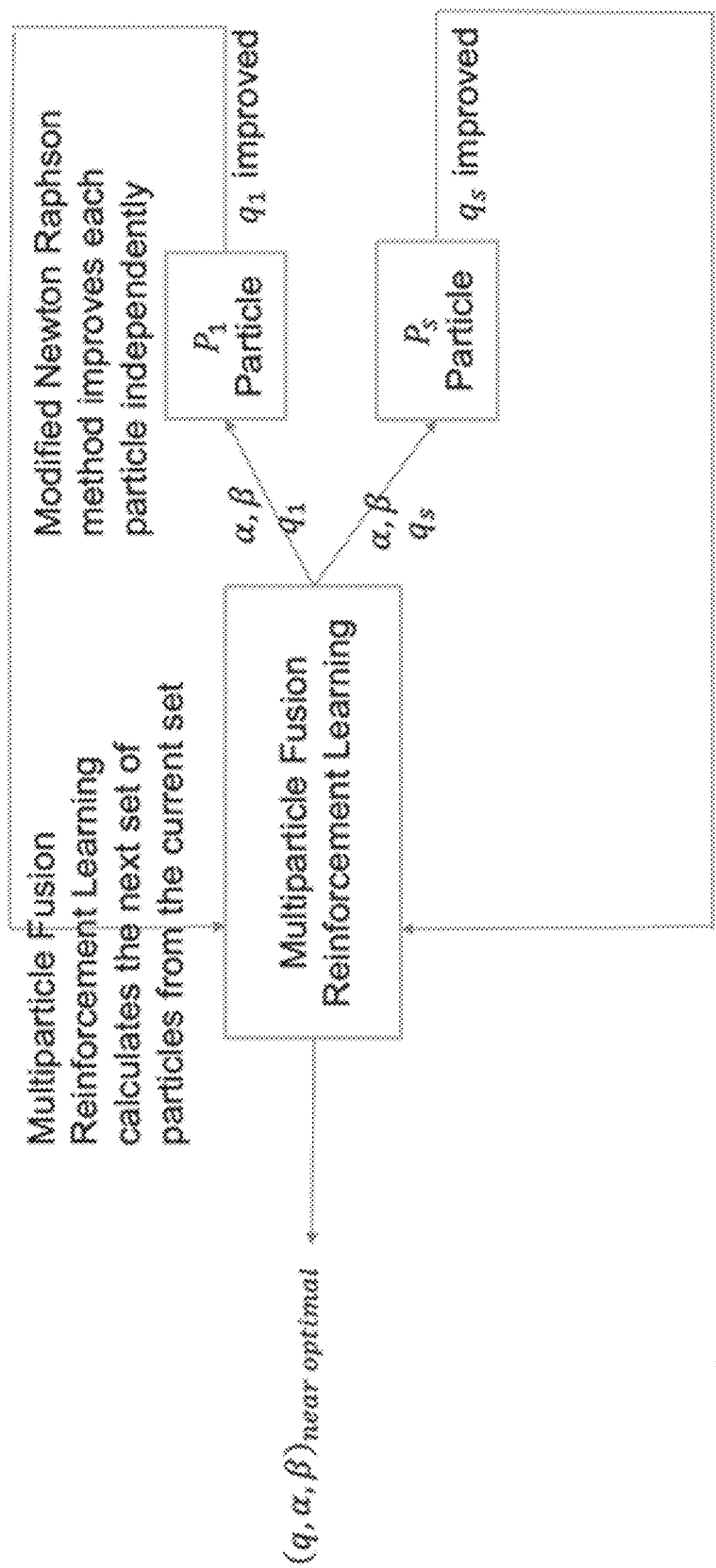

Scalar parameters α and β and constants M and N are determined as follows:
α,β<1
$q_{(k+1)} = q_{(k)} - Q_l(k) \nabla^2 L(q_{(k)})$
$Q_{l+1}(k) = \alpha Q_l(k) - \alpha(\nabla^2 L(q_k^1, \ldots q_k^n))^T \nabla^2 L(q_k^1, \ldots q_k^n) Q_l(k) + (\nabla^2 L(q_k^1, \ldots q_k^n))^T$
$M = \nabla^2 L(q_k)$
$N = \nabla L(q_k(t))$
$q_{(k+1)} = \beta q_{(k)} - \beta NM$
$Q_{l+1}(k) = \alpha Q_l(k) - \alpha N Q_l(k) + N$ An outer parallel algorithm as shown in information 1002 of FIG. 10B is then performed to find near-optimal state information q and parameters α and β, including using multi-particle reinforcement learning-based optimization and fusion, where:
Reinforcement Learning minimizes joint cross entropy
Multiple particles fused and updated with improved initial conditions
Particles associated with poor solutions are removed until a single near optimal particle remains An inner algorithm of the ith problem may be performed as shown in information 1003 of FIG. 10C:
With respect to the reinforcement learning activities, that can be implemented with dynamic programming using backward induction to solve an optimization equation involving the Bellman equation as shown in Equation 1.

$$V(y, t) = \max_u \left\{ \sum_{y'} P_{yy'}(u_t) \cdot V(y', t+1) - L(y, u, t) \right\} \quad \text{Equation 1}$$

The dynamic programming transforms a complex problem into a group of simpler sub-problems, with V being a reward function based on a state at time t, with the object being to maximize the reward at each state y, and with the state defined over a finite set S that is equal to {y(1), y(2), . . . y(n)}. In equation 1, the possibility function Pyy' (the Dempster Shafer possibility matrix) is trained to capture the dynamic characteristics of the underlying domain, such as the providing of electrical power to meet electrical load in the examples of FIGS. 2A-2C. The variable u is an action vector applied on the features of the dynamic characteristics. As shown in Equation 1, the reinforcement learning uses a dynamic approximation function, which is one of the unique aspects of the described reinforcement learning, as conventional dynamic approximation function uses a stochastic (Markov) matrix that is singleton based, such that conventional dynamic programming with the Markov matrix uses a point-based probability matrix with each row adding up to 1. In contrast, the Dempster Shafer possibility function used with the described reinforcement learning is set-based, meaning variables of a single row in a possibility matrix can have set values that do not have to add up to 1—thus, a belief (possibility) value in the possibility matrix may be assigned to sets of potentials without having to distribute the mass among the individual potentials in the set (to equal to 1). In this way, the dynamic approximation using a Dempster Shafer possibility matrix is semantically richer than the dynamic approximation using a point-based probability matrix.

In some embodiments, the described reinforcement learning uses backward induction to find the reward function, which can also be represented as shown in equation 2.

$$\max_{u_t, u_{t+1}, \ldots, u_{t+N-1}} E\left(-\sum_{k=0}^{N-1} L(y, u, t+k)\right) \quad \text{Equation 2}$$

To find the maximization of the reward function V(y,t), the described reinforcement learning can use the principle of backward induction by first determining L, with L being a general measure of uncertainty (which can be the Shannon entropy computed at the Shannon channel), with K being the number of stages in the permutation, and with N being the number of iterations and being selected so that the reward function yields a desired level of accuracy in the possible solutions generated using the reward function. In some embodiments, N can be determined using empirical data or based on a value from previous operations.

In some embodiments, L is represented by Equation 3.

$$L(y,u,t) = -\log(\gamma \cdot C_t + C_t \cdot y_t^T \cdot W_t^{(1)} \cdot u_t + (1-C_t) \cdot y_t^T \cdot W_t^{(2)} \cdot u_t)| \quad \text{Equation 3}$$

The described reinforcement learning can learn the dynamic characteristics of the underlying domain by learning the variables γ and W, with the variable γ being a positive coefficient, and γ and W being determined in some embodiments using the recursive least square method. The variable $C_t$ is the observed grade after processing the action $U_{t-1}$ at previous time t−1, wherein 0<$C_t$≤1—for example, $C_t$ can be the normalized confidence generated by the control action determination activities. Equation 1 can be re-written in matrix form as shown in Equation 4:

$$\begin{bmatrix} V(y^{(1)}, t) \\ V(y^{(2)}, t) \\ \vdots \\ V(y^{(n)}, t) \end{bmatrix} = \max_u \left\{ \begin{bmatrix} P_{y^{(1)}y^{(1)}}(u_{t,1}) & \cdots & P_{y^{(1)}y^{(n)}}(u_{t,1}) \\ \vdots & \ddots & \vdots \\ P_{y^{(n)}y^{(1)}}(u_{t,n}) & \cdots & P_{y^{(n)}y^{(n)}}(u_{t,n}) \end{bmatrix} \cdot \begin{bmatrix} V(y^{(1)}, t+1) \\ V(y^{(2)}, t+1) \\ \vdots \\ V(y^{(n)}, t+1) \end{bmatrix} + \begin{bmatrix} L(y^{(1)}, u_{t,1}, t) \\ L(y^{(2)}, u_{t,2}, t) \\ \vdots \\ L(y^{(n)}, u_{t,n}, t) \end{bmatrix} \right\} \quad \text{Equation 4}$$

Once the coefficients of L are learned, the possibility matrix and the reward function can be derived using backward induction rather than going through all of the iterations of the possibility function. The described reinforcement learning then provides the generated reward function based on the actions vector (u), which will provide one or more control actions based on the generated reward function. The described reinforcement learning can repeat this cycle until each particle has gone through a sufficient number of iterations to achieve a desired level of accuracy or a maximum number of iterations has been performed.

It will be appreciated that the examples of FIGS. 2A-2C are provided for illustrative purposes and are simplified for the sake of brevity, and the inventive techniques may be used in a wide variety of other situations, including in other environments and with other types of automated control action determination techniques (e.g., target systems that do not include electrical grids or electrical power production), some of which are discussed below. As one non-exclusive example, the target system may include a motor and the control system may control when and how the motor is used (e.g., to move an electrical vehicle or other type of powered vehicle, adjust valves or openings in physical systems, etc.)—if so, the control action manager component may minimize or otherwise reduce excess torque or other wasted use of the motor, such as by selecting from multiple enumerated control values for a control system actuator that regulates the output of the motor (e.g., a transmission or gear system). As another non-exclusive example, the target system may include one or more super-capacitor electrical devices and the control system may control when and/or how and/or how much power is supplied to and/or from the super-capacitor(s) (e.g., to supplement batteries in use, such as batteries being used to power trains or subways or automobiles or bicycles or airplanes or drones or other vehicles, by using dynamic braking to store power and by reducing the power load on the batteries at time of vehicle acceleration or other times of high power demand, etc.)—if so, the control system manager component may minimize or otherwise reduce power dissipation and/or excess use of the batteries beyond a defined threshold, such as by selecting from multiple enumerated control values for a control system actuator that regulates the input to and/or output of the super-capacitor(s). As another non-exclusive example, the control system may be controlling a target system having an electrical device that performs computing functionality (e.g., a computer device or system) and generates data (e.g., network communications, data to be stored, etc.), such as in an attempt to regulate network traffic that is sent (e.g., to prevent problems of one or more defined types, such as with network latency, bandwidth usage, dropped packets, etc.) or to regulate usage of storage space and capabilities (e.g., to prevent storage bottlenecks, excess device usage, etc.)—if so, the control system manager component may minimize or otherwise reduce network traffic or other generated data that is outside a defined range and/or has problems of any of one or more defined types, such as by selecting from multiple enumerated control values for a control system actuator that regulates an amount and/or timing of network traffic sent and/or data stored, etc.

FIG. 3 is a block diagram illustrating example computing systems suitable for performing techniques for implementing automated control systems to control or otherwise manipulate at least some operations of specified target physical systems or other target systems, including using one or more control state manager decision modules for repeatedly and automatically performing multi-particle optimization activities via iterative particle propagation and multi-particle fusion using reinforcement learning to optimize a plurality of particles that are generated for a time period to represent different state information within the physical system in order to learn improved projected future state information that provides one or more possible solutions for satisfying projected functionality demand during that time period while best meeting one or more defined goals, as discussed in greater detail elsewhere herein. In particular, FIG. 3 illustrates a server computing system 300 suitable for providing at least some functionality of an MPRLO system 340 to generate automated control systems 325 and/or for providing at least some functionality of one or more such automated control systems 325 that each include one or more control action manager decision module components 326 and optionally other components 329. FIG. 3 further illustrates various client computer systems 350 that may be used by customers or other users of the MPRLO system 340 to generate and/or execute one or more automated control systems, and one or more target systems to be controlled (in this example, target system 1 360 and target system 2 370) and that are accessible in this example to the MPRLO system 340 and/or to an automated control system 325 and its control state manager decision module(s) 326 over one or more computer networks 390, although in other embodiments some or all of such an automated control system may execute local to a target system that it is controlling. In other embodiments, multiple computing systems may be used for the execution of an MPRLO system 340 and/or an automated control system 325 (e.g., to have one or more computing systems executing an MPRLO Decision Module Construction component of the MPRLO system 340 for initial configuration and setup before run-time control occurs, and one or more other computing systems performing run-time control by executing one or more copies of a resulting automated control system; to have one or more computing systems executing a control action manager decision module component that are separate from one or more other computing systems executing some or all other components of an automated control system that includes the control action manager decision module component; to have different computing systems executing different automated control systems and/or control action manager decision module components; etc.).

In the illustrated embodiment, the executing MPRLO system 340 is in memory 330, and in some embodiments the system includes various software instructions that when executed program one or more of the hardware CPU processors 305 to provide an embodiment of an MPRLO system as described elsewhere herein, such as to generate one or more automated control systems 325 that are stored on storage 320. The memory 330 may further optionally include one or more other executing modules 335, such as one or more of the automated control systems 325 and/or other software system. During operation, in at least some embodiments, a control action manager decision module of an executing control system may obtain various input data (not shown) regarding an associated target system (e.g., from one or more sensors), and modify one or more target system state models (e.g., models 323 stored on storage 320 or otherwise included within a particular corresponding automated control system) that are in use to control the target system (e.g., target system 1, target system 2, etc.), such as by repeatedly and automatically performing multi-particle optimization activities via iterative particle propagation and multi-particle fusion using reinforcement learning to optimize a plurality of particles that are generated for a time period to represent different state information within the physical system in order to learn improved projected future state information that provides one or more possible solutions for satisfying projected functionality demand during that time period while best meeting one or more defined goals, as well as exchanging various information with other executing components, as discussed in greater detail elsewhere herein.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). While not illustrated in FIG. 3, the server computing system 300 and/or another associated system (not shown) may include one or more hardware GPU ("graphics processing unit") computer processors (not shown) that are used with a GPU-based vectorization engine, such as in addition to one or more other CPU computer processors and/or instead of one or more other CPU computer processors. In addition, the illustrated client computer systems 350 may each have components similar to those of server computing system 300, including one or more hardware CPUs 351 and/or hardware GPUs (not shown), I/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, including to optionally locally execute one or more control systems or control action manager decision module components, but such computing systems and components are also not illustrated in this example for the sake of brevity.

During execution, the MPRLO system 340 and/or an automated control system 325 may interact with computing systems 350 and optionally other computing systems/devices (not shown) over the network 390 (e.g., via the Internet and/or the World Wide Web, via a private cellular network, etc.), as well as the target systems 360 and 370 in this example. In this example embodiment, the MPRLO system includes functionality related to generating and deploying control systems 325 in configured manners for customers or other users, as discussed in greater detail elsewhere herein, as well as generating or deploying such control systems with control action manager decision modules at runtime. The other computing systems 350 may also be executing various software as part of interactions with the MPRLO system 340 and/or an automated control system, such as in memory 357 (e.g., as part of a Web browser, a specialized client-side application program, etc.) and to optionally interact with one or more interfaces (not shown) of the MPRLO system 340 and/or an automated control system to control their operation, as well as to perform various other types of actions, as discussed in greater detail elsewhere. Various information related to the functionality of the MPRLO system 340 and/or an automated control system may be stored in storage 320, such as information 321 related to users of the MPRLO system (e.g., account information), and additional information 323 related to one or more target physical systems (e.g., models that have been generated of particular target systems, such as target systems 1 and/or 2) and are optionally in use by an associated MPRLO-generated automated control system.

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated MPRLO system 340 and its components may in some embodiments be distributed in additional components. Similarly, in some embodiments some of the functionality of the MPRLO system 340 and/or automated control systems 325 may not be provided and/or other additional functionality may be available.

As part of implementing an automated control system for a particular target system, the automated control system may optionally include multiple control action manager decision modules that each controls a distinct subset or portion of one or more corresponding target systems. Such an automated control system may in some situations have a distributed architecture that provides cooperative distributed control of the corresponding target system(s), such as with multiple control action manager decision modules that operate in a partially decoupled manner with respect to each other. If so, the various control action manager decision modules' operations for the automated control system may be at least partially synchronized, such as by each reaching a consensus with one or more other control action manager decision modules at one or more times, even if a fully synchronized convergence of all control action manager decision modules at all times is not guaranteed or achieved.

The MPRLO system may in some embodiments implement a Control System Construction component that interacts with one or more users to obtain a description of a target system, including restrictions related to the various elements of the target system, and one or more goals to be achieved during control of the target system—the Control System Construction component then performs various automated actions to generate, test and deploy one or more executable control systems each having at least one control action manager decision module (also referred to at times as "decision elements" and/or "agents") to use in performing the control of the target system. The Control System Construction component may thus operate as part of a configuration or setup phase that occurs before a later run-time phase in which the generated control system(s) are executed to perform control of the target system, although in some embodiments and situations the Control System Construction component may be further used after an initial deployment to improve or extend or otherwise modify an automated control system that has one or more control action manager decision modules (e.g., while the automated control system continues to be used to control the target system), such as to implement functionality to improve and update a model of a target system being controlled, or to add, remove or modify components of the automated control system.

When the one or more executable control systems are deployed and executed with one or more control action manager decision module components for each control system, the MPRLO system may further provide various components within or external to the control systems being executed to manage their control of the target system, such as one or more Coordinated Control Management components to coordinate the control actions of multiple control action manager decision modules that are collectively performing the control of the target system, and/or one or more other components. For example, some or all control systems may each include such a Coordinated Control Management component to attempt to synchronize that control system's control action manager decision module(s)'s local solutions and proposed control actions with those of one or more other control action manager decision modules in the automated control system (or in another cooperating control system), such as by determining a consensus shared model with those other control action manager decision modules that simultaneously provides solutions from the control action manager decision module's local model (or sub-model) and the model(s) (or sub-models) of the one or more other control action manager decision modules. Such inter-module synchronizations may occur repeatedly to determine one or more control actions for each control action manager decision module at a particular time, as well as to be repeated over multiple times for ongoing control. In addition, each control action manager decision module's model is implemented in some embodiments as a Hamiltonian function that reflects a set of coupled differential equations based in part on constraints representing at least part of the target system, such as to allow each control action manager decision module's model and its Hamiltonian function implementation to be combined with the models of one or more other control action manager decision modules by adding additional expressions for those other control action manager decision modules' models within the initial Hamiltonian function for the local model of the control action manager decision module, as discussed in greater detail elsewhere herein.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the control systems 325 and/or control state manager decision modules 326 and/or other MPRLO components; by the MPRLO system 340; etc.) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
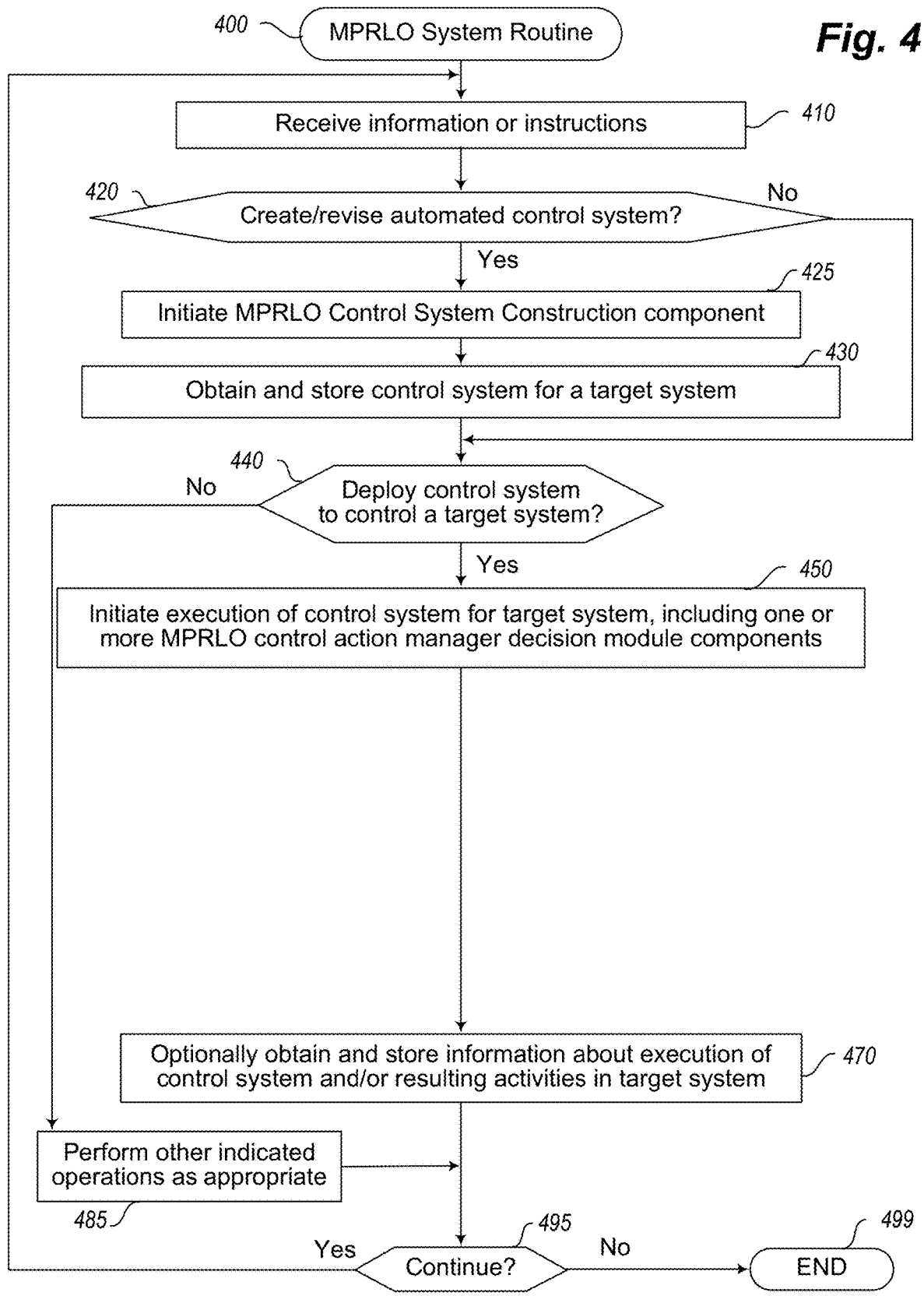
FIG. 4 illustrates a flow diagram of an example embodiment of a Multi-Particle Reinforcement Learning-based Optimization (MPRLO) System routine.

FIG. 4 is a flow diagram of an example embodiment of a Multi-Particle Reinforcement Learning-based Optimization (MPRLO) system routine 400. The routine may, for example, be provided by execution of the MPRLO system 340 of FIG. 3 and/or the MPRLO system 140 of FIG. 1B, such as to provide functionality to construct and implement automated control systems for specified target systems.

The illustrated embodiment of the routine begins at block 410, where information or instructions are received. If it is determined in block 420 that the information or instructions of block 410 include an indication to create or revise an automated control system for a particular target system, the routine continues to block 425 to initiate execution of a Control System Construction component, and in block 430 obtains and stores one or more resulting control systems for the target system that are created in block 425. One example of a routine for such a Control System Construction component is discussed in greater detail with respect to FIGS. 5A-5B.

After block 430, or if it is instead determined in block 420 that the information or instructions received in block 410 are not to create or revise one or more control systems, the routine continues to block 440 to determine whether the information or instructions received in block 410 indicate to deploy one or more created control systems to control a specified target system, such as for an automated control system that was created immediately prior with respect to block 425 (such that the deployment occurs in a manner that is substantially simultaneous with the creation), or in other situations may include one or more control systems that were created at a previous time and stored for later use. If it is determined to deploy one or more such control systems for such a target system, the routine continues to block 450 to initiate the execution of those one or more control systems for that target system, such as on one or more computing systems local to an environment of the target system, or instead on one or more remote computing systems that communicate with the target system over one or more intermediary computer networks (e.g., one or more computing systems under control of a provider of the MPRLO system). The execution of some or all such control systems may further include executing an associated control action manager decision module component to improve functionality of the control system during operation, with FIG. 7 providing an example of a routine for execution of a control action manager decision module component.

After block 450, the routine continues to block 470 to optionally obtain and store information about the operations of the one or more control systems and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of control systems and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple control action manager decision modules for an automated control system in a partially decoupled manner allows various changes to be made while the automated control system is in operation, such as to add one or more new control action manager decision modules, to remove one or more existing control action manager decision modules, to modify the operation of a particular control action manager decision module (e.g., by changing rules or other information describing the target system that is part of a model for the control action manager decision module), etc. In addition, the partially decoupled nature of multiple such control action manager decision modules in an automated control system allows one or more such control action manager decision modules to operate individually at times, such as if network communication issues or other problems prevent communication between multiple control action manager decision modules that would otherwise allow their individualized control actions to be coordinated—in such situations, some or all such control action manager decision modules may continue to operate in an individualized manner, such as to provide useful ongoing control operations for a target system even if optimal or near-optimal solutions cannot be identified from coordination and synchronization between a group of multiple control action manager decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
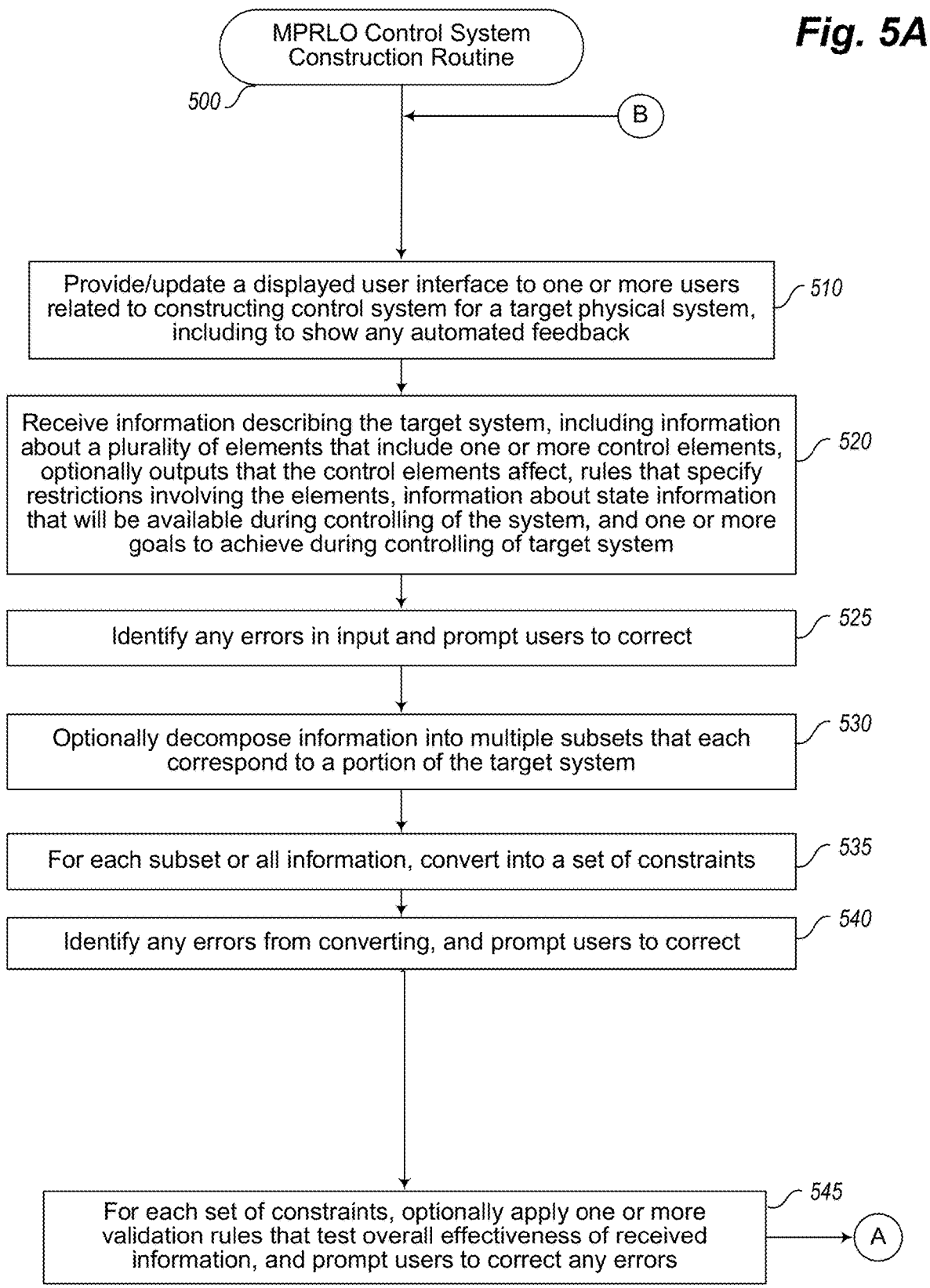
FIGS. 5A-5B illustrate a flow diagram of an example embodiment of an MPRLO Control System Construction routine.
Figure 5B:
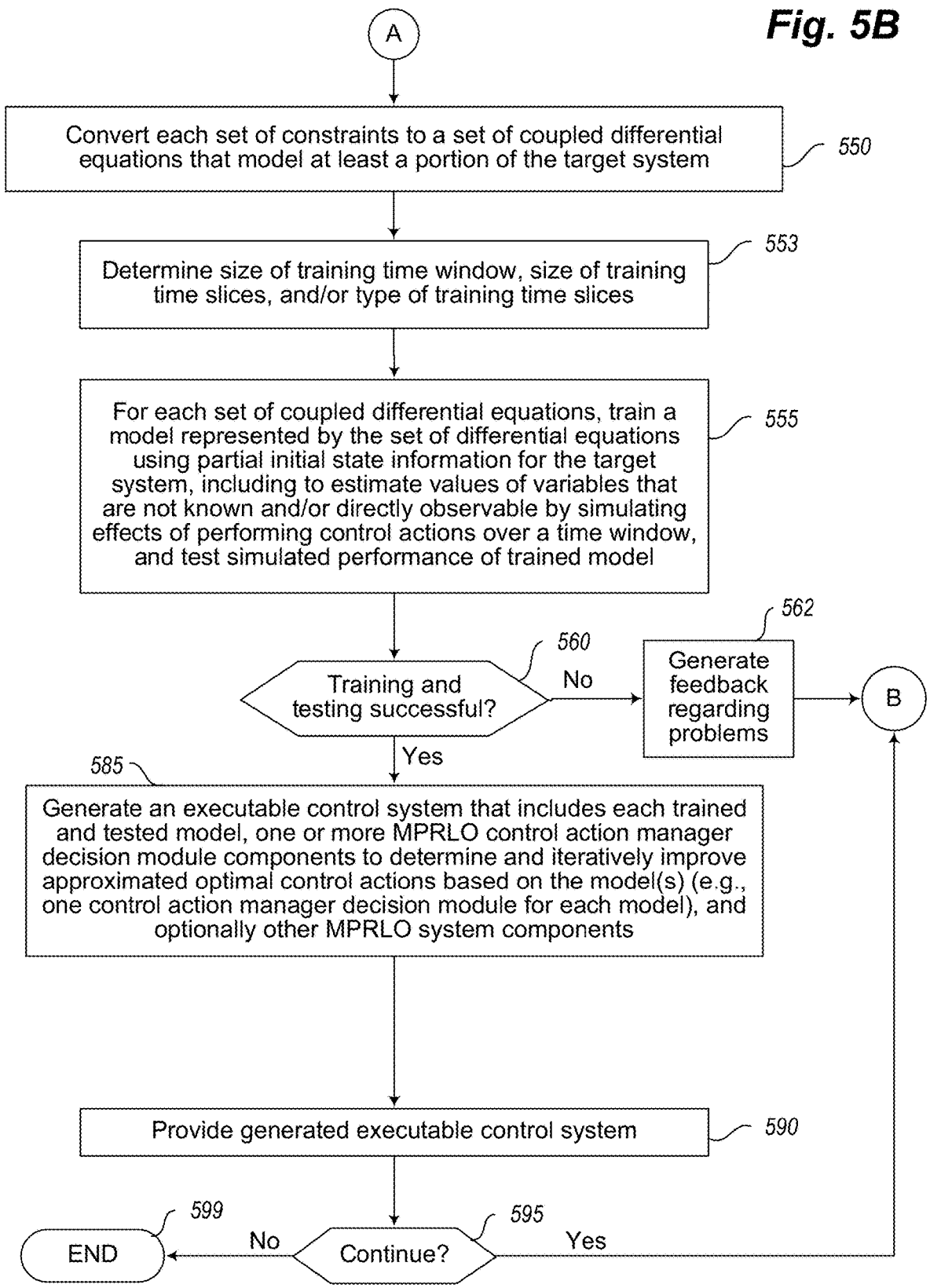

FIGS. 5A-5B illustrate a flow diagram of an example embodiment of an MPRLO Control System Construction routine 500. The routine may, for example, be provided by execution of a component of the MPRLO system 340 of FIG. 3 and/or the component 142 of FIG. 1B, such as to provide functionality to allow users to provide information describing a target system of interest, and to perform corresponding automated operations to construct one or more control systems to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use, such as by implementing an online interface that is available to a variety of remote users over a public network such as the Internet, while in other embodiments a copy of the MPRLO system and/or particular MPRLO components may be used to support a single organization or other group of one or more users, such as by being executed on computing systems under the control of the organization or group. In addition, the MPRLO Control System Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

The illustrated embodiment of the routine 500 begins at block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 520 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables, such as from passive sensors), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system.

After block 520, the routine continues to block 525 to identify any errors that have been received in the user input, and to prompt the user(s) to correct those errors, such as by updating the display in a corresponding manner as discussed with respect to block 510. While the identification of such errors is illustrated as occurring after the receiving of the information in block 520, it will be appreciated that some or all such errors may instead be identified as the users are inputting information into the user interface, such as to identify syntax errors in rules or other information that the users specify. After block 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different subgroups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 525 and 510. While not illustrated in this example, the routine may in some situations in blocks 525 and/or 540 return to block 510 when such errors are identified, to display corresponding feedback to the user(s) and to allow the user(s) to make corrections and re-perform following operations such as those of blocks 520-540. Errors identified in the converting process in block 540 may include, for example, errors related to inconsistent restrictions, such as if the restrictions as a group are impossible to satisfy.

After block 540, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 525, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or prespecified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information determined externally for the target system (e.g., from passive sensors), including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not continues to block 562 to generate feedback regarding the problems, and then returns to block 510 to display the feedback information to the users to allow them to correct errors that caused the lack of success. If it is instead determined in block 560 that the testing and training were successful, however, the routine continues instead to block 585 to generate an executable control system with a control action manager decision module for each trained and tested model that includes that model, d to determine optimal or near-optimal control actions to perform for the target system based on the information included in the model and in light of the one or more goals for that control action manager decision module. The generated executable control system may in some embodiments and situations further include a local MPRLO Coordinated Control Management component to coordinate control actions of multiple control action manager decision modules that collectively will provide control action decisions for the target system, such as by synchronizing respective models of the various control action manager decision modules over time. After block 585, the routine continues to block 590 to provide the generated executable control system for use, including to optionally store it for later execution and/or deployment.

After block 590, the routine continues to block 595 to determine whether to continue, such as until an explicit indication to terminate or suspend operations is received. If it is determined to continue, the routine returns to block 510, and otherwise continues to block 599 and ends.

FIGS. 6A-6B illustrate a flow diagram of an example embodiment of a routine 600 corresponding to a generic representation of a control system that is being executed. The routine may, for example, be provided by execution of an automated control system 325 of FIG. 3, the automated control system 195a of FIG. 1A, the automated control system 205a of FIGS. 2A-2C, and/or a control system 122 or 126 of FIG. 1B, such as to provide functionality for controlling a target system in a manner specific to information and a model encoded for the control system, including to reflect one or more goals to be achieved by the control system during its controlling activities. As discussed in greater detail elsewhere, in some embodiments and situations, a single control system may act alone to control a target system, optionally with multiple control action manager decision modules that each control one or more distinct control elements for the target system or otherwise represent or interact with a portion of the target system, while in other embodiments, multiple control systems may collectively and cooperatively act to control a particular target system, such as with each control system controlling one or more distinct control elements for the target system or otherwise representing or interacting with a portion of the target system. The routine 600 further reflects actions performed by an example control system when it is deployed in controlling a portion of a target system, although execution of at least portions of a control system may occur at other times, such as initially to train a model for the control system before the control system is deployed, as discussed in greater detail with respect to the MPRLO Control System Construction routine 500 of FIGS. 5A-5B.

The illustrated embodiment of the routine 600 begins at block 610, where an initial model for the control system is determined that describes at least a portion of a target system to be controlled, one or more goals for the control system to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5B—in some embodiments and situations, such training for block 615 is performed only if initial training is not done by the routine 500 of FIGS. 5A-5B, while in other embodiments and situations the training of block 615 is performed to capture information about a current state of the target system at a time that the control system begins to execute (e.g., if not immediately deployed after initial creation and training) and/or to re-train the model at times as discussed in greater detail with respect to routine 700 of FIG. 7 as initiated by block 630, and in yet other embodiments and situations such training may not be performed.

After block 615, the routine continues to block 619 to determine a time period to use for performing each control action decision for the control system, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the control system. Blocks 620-680 are then performed in a control loop for each such time period going forward until execution of the control system is suspended or terminated, although in other embodiments a particular control system may execute for only a single time period each time that it is executed.

In block 625, the routine optionally obtains state information for the time period, such as current state information that has been received from the target system (e.g., via one or more passive sensors) or one or more related external sources since the last time period began, and/or by actively retrieving current values of one or more elements of the target system or corresponding variables as needed. In block 630, the routine then initiates execution of a local MPRLO Control Action Manager component of the control system, with one example of such a routine discussed in greater detail with respect to routine 700 of FIG. 7. In block 635, the results of the execution of the component in block 630 are received, including to obtain and initiate one or more control action determinations for the current time period, and to optionally receive information about improved state information and other information that may be used to update the model for the control system.

In block 680, the routine then optionally obtains information about the results in the target system of the control actions performed, and stores and/or provides information to the MPRLO system about such obtained results and/or about the activities of the control system for the current time period. After block 680, the routine continues to block 695 to determine whether to continue, such as until an indication to terminate or suspend operations is received (e.g., to reflect an end to current operation of the target system or an end of use of the control system to control at least a portion of the target system). If it is determined to continue, the routine returns to block 620 to start the next time period, and otherwise continues to block 699 and ends.

FIG. 7 is a flow diagram of an example embodiment of an MPRLO Control Action Manager routine 700. The routine may, for example, be provided by execution of a control action manager decision module component 326 of FIG. 3 and/or control action manager decision module 195c of FIG. 1A and/or control action manager decision module component 205c of FIGS. 2A-2C and/or other control action manager decision module components as described herein, such as to determine control actions for a control system to propose and/or implement for a target system during a particular time period, such as by repeatedly and automatically performing multi-particle optimization activities via iterative particle propagation and multi-particle fusion using reinforcement learning to optimize a plurality of particles that are generated for a time period to represent different state information within a target system in order to learn improved projected future state information that provides one or more possible solutions for satisfying projected functionality demand during that time period while best meeting one or more defined goals. While the illustrated embodiment of the routine is performed in a manner local to a particular control system, such that some or all control systems may each implement a local version of such a routine, in other embodiments the routine may be implemented in a centralized manner by one or more components with which one or more control systems interact over one or more networks, such as with a particular control system indicated to be used at a particular time rather than acting on behalf of the local control system.

The illustrated embodiment of the routine 700 begins at block 703, where information or a request is received. The routine continues to block 705 to determine a type of the information or request, and to proceed accordingly. In particular, if a request is received in block 703 to determine a control action using a determined one of multiple enumerated possible control values for a current time period given a current model of the local control system, the routine continues to block 710 to begin to perform such activities, as discussed in greater detail with respect to block 710-785. Otherwise, the routine continues instead to block 790 to perform one or more other indicated operations as appropriate, and to then proceed to block 799. Such other indicated operations may include, for example, receiving information about current models and/or control actions proposed or performed by one or more other control systems that are collectively controlling a target system with the local control system (such as for use in synchronizing the model of the local control system with such other control systems by generating a consensus or converged shared model), to receive updates to a model or underlying information for the model for use in ongoing operation of the routine 700 (e.g., from an MPRLO Control System Construction component, etc.), to receive current state information for the target system, such as for use as discussed in routine 600 of FIGS. 6A-6B, etc.

If it determined in block 705 that a request for a determined control action to implement was received in block 703 for a current time period and based on a current model of the local control system, the routine continues to block 710 to obtain a current model for at least a portion of the target system (e.g., a current set of coupled differential equations that represent the current model), optionally along with additional state information for the target system for the current time. The routine then continues to block 715 to determine or otherwise obtain an indication of an interval time window size over which to determine the control action to implement, and then performs block 720 during that time window to determine improved projected future state information corresponding to a possible solution that will be used to determine the control action, with the routine 800 of FIG. 8 providing one example of such activities. In block 785, the routine receives information from block 720, and determines one or more control actions to implement for the time period, with corresponding information stored and/or provided to the control system containing the control action manager decision module component. If a situation occurs in which no possible solutions are determined for the time period that enable all of the projected demand for the time period to be met for an indicated type of functionality, the routine may instead provide as much functionality of that type as possible (e.g., by requesting each provider of that type of functionality to provide as much of it as possible), or instead determine one or more control actions to implement in other manners (e.g., by using one or more default control actions, by balancing available functionality capacity or availability with associated costs or other constraints, etc.).

After block 785, the routine continues to block 799 and ends (e.g., to return to block 630 of routine 600 if the current execution of routine 700 was initiated there). It will be appreciated that if the routine 700 was instead implemented as a centralized routine that supports one or more control systems remote from the executing control action manager decision module component for the routine, the routine 700 may instead return to block 703 to await further information or requests.

Figure 8:
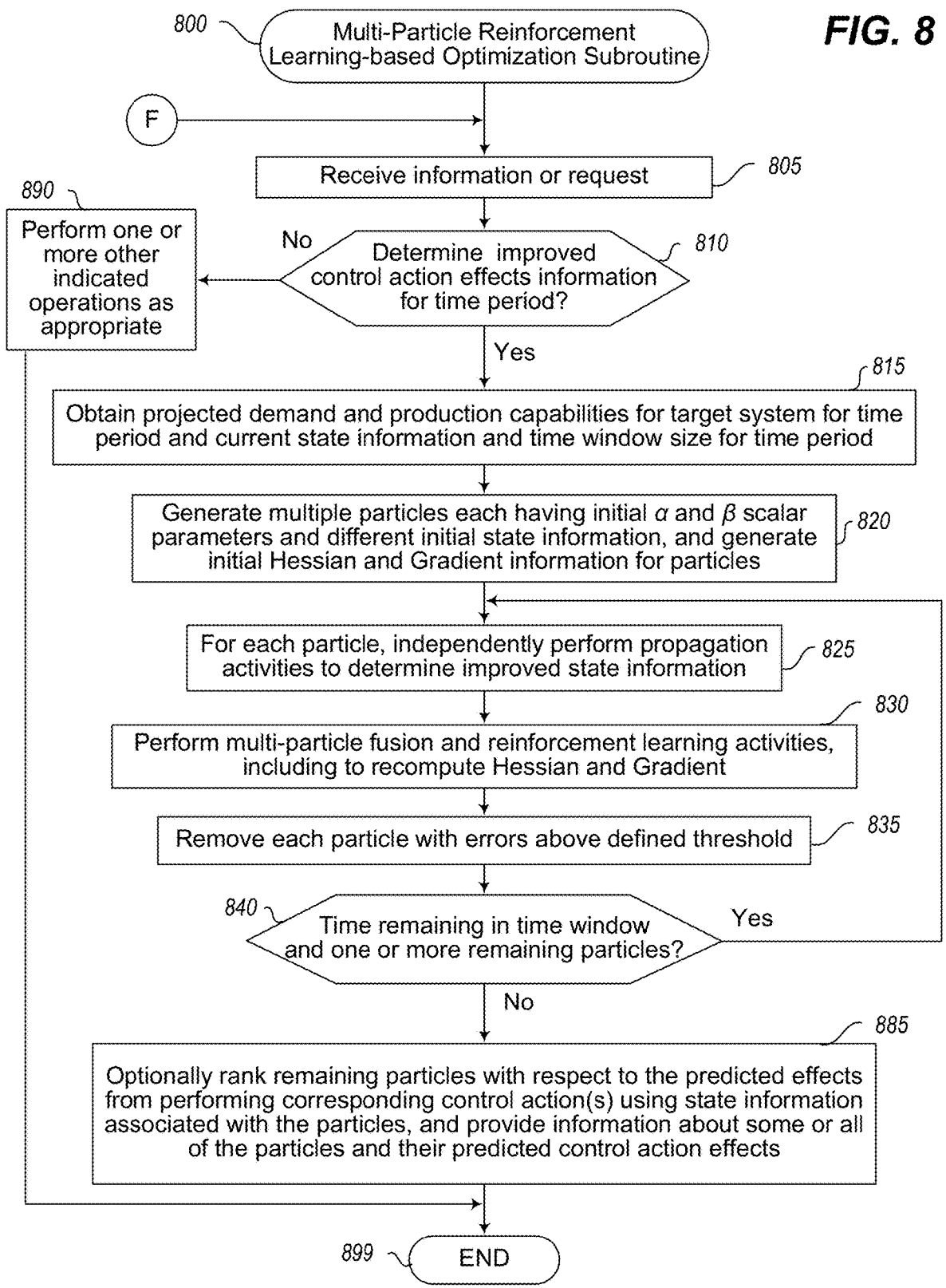
FIG. 8 illustrates a flow diagram of an example embodiment of a Multi-Particle Reinforcement Learning-based Optimization routine.

FIG. 8 is a flow diagram of an example embodiment of a Multi-Particle Reinforcement Learning-based Optimization routine 800, such as by repeatedly and automatically performing multi-particle optimization activities via iterative particle propagation and multi-particle fusion using reinforcement learning to optimize a plurality of particles that are generated for a time period to represent different state information within a target system in order to learn improved projected future state information that provides one or more possible solutions for satisfying projected functionality demand during that time period while best meeting one or more defined goals. In the illustrated embodiment, the routine 800 is performed in a local manner for a particular local control action manager decision module component, such as by being included within that local control action manager decision module component, although in other embodiments the routine 800 may be implemented in a centralized manner to support one or more control action manager decision module components that are remote from a computing system implementing the component for the routine and that communicate with those control action manager decision module components over one or more computer networks, such as with a particular control action manager decision module component indicated to be used at a particular time rather than acting on behalf of the local control action manager decision module component.

The illustrated embodiment of the routine 800 begins at block 805, where it waits to receive a request or information. The routine continues to block 810 to determine if instructions are received to determine improved control action effects information for the time period by repeatedly and automatically performing multi-particle optimization activities via iterative particle propagation and multi-particle fusion using reinforcement learning to optimize a plurality of particles that are generated for a time period to represent different state information within a target system in order to learn improved projected future state information that provides one or more possible solutions for satisfying projected functionality demand during that time period while best meeting one or more defined goals, and if so continues to perform blocks 815-885.

In block 815, the routine obtains (e.g., from information received in block 805) projected demand of an indicated type of functionality from the target system for the time period, projected capacity or availability of that type of functionality from the target system for the time period, information about a time window during which to determine improved operational information to use, and current state information for the target system. In block 820, the routine then generates multiple particles that each have a different set of state information and that includes initial values for scalar parameters α and β, and generates initial Hessian and gradient information. Blocks 825-835 are then performed for a current interval within the time window, including in block 825 to independently propagate each particle to determine improved state information for it, in block 830 to perform multi-particle fusion and reinforcement learning activities to recompute updated Hessian and gradient information, and in block 835 to remove any particles that have associated errors from the propagation or that otherwise do not satisfy one or more indicated criteria. In block 840, the routine determines if there is time remaining in the time window for another interval and if there are one or more remaining particles, and if so returns to block 825 to initiate activities for a next interval. While not illustrated in this example embodiments, in other embodiments the loop of blocks 825-835 may end before the time window is ended if one or more possible solutions are determined for one or more particles (e.g., if further improvement for those particles has stopped).

After it is determined in block 840 that the time window has ended (or if no particles remain), the routine continues to block 885 to optionally rank the remaining particles (if multiple remain with possible solutions for the time period), and provides information corresponding to at least one such possible solution for the remaining particles (if any).

If it is instead determined in block 810 that instructions are not received to determine improved control action effects information for the time period by repeatedly and automatically performing multi-particle optimization activities via iterative particle propagation and multi-particle fusion using reinforcement learning to optimize a plurality of particles that are generated for a time period to represent different state information within a target system in order to learn improved projected future state information that provides one or more possible solutions for satisfying projected functionality demand during that time period while best meeting one or more defined goals, the routine continues instead to block 890 to store received information (if any) or to perform one or more indicated operations (if any) as appropriate.

After blocks 885 or 890, the routine continues to block 895 and ends (e.g., to return to block 720 of routine 700 if the current execution of routine 800 was initiated there). In other embodiments, the routine 800 may instead determine whether to continue, and if so returns to block 805 to await further information or requests.

FIG. 9 illustrates a flow diagram of an example embodiment of a routine 900 performed for a representative generic target system, with respect to interactions between the target system and one or more control systems that are controlling at least a portion of the target system. The routine may, for example, be provided by execution of a target system 360 and/or 370 of FIG. 3, a physical system 195b of FIG. 1A, a target system 160 and/or 170 of FIG. 1B, and/or an electrical grid 205k discussed with respect to FIGS. 2A-2C, such as to implement operations specific to the target system. It will be appreciated that the illustrated embodiment of the routine focuses on interactions of the target system with the one or more control systems, and that many or all such target systems will perform many other operations in a manner specific to those target systems that are not illustrated here for the purpose of brevity.

The routine begins at block 910, where it optionally provides initial state information for the target system to an MPRLO system for use in an automated control system of the MPRLO system for the target system, such as in response to a request from the MPRLO system or its automated control system for the target system, or instead based on configuration specific to the target system (e.g., to be performed upon startup of the target system). After block 910, the routine continues to perform a loop of blocks 920-940 to control ongoing operations of the target system. As discussed in greater detail elsewhere, the blocks 920, 930, 940 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, multiple hours, etc.).

In particular, the routine in block 920 receives one or more inputs from a collective group of one or more control systems for the target system, including one or more modified values for or other manipulations of one or more control elements of a plurality of elements of the target system that are performed by one or more such control systems. After block 920, the routine continues to block 930 to perform one or more actions in the target system based on the inputs received, including to optionally produce one or more resulting outputs or other results within the target system based on the manipulations of the control elements. In block 940, the routine then optionally provides information about the outputs or other results within the target system and/or provides other current state information for the target system to the one or more control systems, such as to be obtained and measured or otherwise analyzed via passive sensors and/or active sensors.

The routine then continues to block 995 to determine whether to continue, such as until an explicit indication to terminate or suspend operation of the target system is received. If it is determined to continue, the routine returns to block 920 to begin a next set of control actions for a next time period, and otherwise continues to block 999 and ends. As discussed in greater detail elsewhere, state information that is provided to a particular control system may include requests from external systems to the target system, which the automated control system may determine how to respond to in one or more manners. In addition, while the control system in the illustrated embodiment makes modifications directly to actuators within the target system (rather than providing modification information to the target system for it to use to attempt to make such modifications, in a manner analogous to blocks 920 and 930), in other embodiments the routine 900 may receive and act on such actuator modification requests.

It will be appreciated that the functionality provided by the routines discussed above may be provided in alternative ways in some embodiments, such as being split among more routines or consolidated into fewer routines. Similarly, illustrated routines may in some embodiments provide more or less functionality than is described, such as when other illustrated routines instead lack or include such functionality respectively, or when the amount of functionality provided is altered. Also, while various operations may be illustrated as being performed in a particular manner (e.g., in serial or parallel, synchronously or asynchronously, etc.) and/or in a particular order, those skilled in the art will appreciate that the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described for purposes of illustration, modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form (e.g., while some aspects of the invention may not be recited as being embodied in a computer-readable medium or as part of a system, other aspects may likewise be so embodied), and with any combination of claim elements in different claims that are not logically inconsistent.

What is claimed is:

1. A computer-implemented method comprising:
    generating, by one or more computing systems, a model of a physical system whose operations include providing electrical power for an electrical grid with multiple nodes each having at least one producer of electrical power and at least source of electrical power load, wherein the model describes operational characteristics of the physical system and includes multiple rules that each has one or more conditions to evaluate and that specify restrictions involving a plurality of elements of the physical system and includes state information from sensors for the physical system and includes information about multiple control actions available to affect the providing of the electrical power and includes an indicated goal to maximize for the operations; and
    controlling, by the one or more computing systems and using the generated model, the operations of the physical system for each of multiple successive current time periods, including:
        receiving, by the one or more computing systems, information that includes total projected electrical power production available from the physical system for the current time period and includes total projected electrical power load for the physical system for the current time period, wherein the total projected electrical power production includes respective projected electrical power production for each of the multiple nodes, wherein the total projected electrical power load includes respective projected electrical power load for each of the multiple nodes, and wherein the total projected electrical power load exceeds the total projected electrical power production by a difference having a determined amount;
        generating, by the one or more computing systems, multiple particles that each represents a different set of state information for the physical system;
        for each of a plurality of iterations during at least some of the current time period,
            propagating, by the one or more computing systems, and separately for each of the multiple particles, the respective state information for the particle to attempt to determine projected future state information for the particle that reflects a decrease in the determined amount of the difference for the current time period in light of the indicated goal; and
            combining, by the one or more computing systems and using reinforcement learning, information from at least some of the multiple particles having projected future state information;
        determining, by the one or more computing systems and after the plurality of iterations, one or more of the multiple particles whose projected future state information provides a solution for the physical system to satisfy the total projected electrical power load for the current time period using the total projected electrical power production for the current time period in light of the indicated goal, including determining that the difference between the total projected electrical power load and the total projected electrical power production is eliminated for the determined one or more particles;
        implementing, by the one or more computing systems, and using at least one of the determined one or more particles, at least one control action in the physical system to satisfy the total projected electrical power load for the current time period using the total projected electrical power production for the current time period; and
        updating, by the one or more computing systems, the generated model to reflect the implementing of the at least one control action using the at least determined particle.

2. The computer-implemented method of claim 1 wherein the combining of the information for the at least some particles using the reinforcement learning includes generating an updated hessian and gradient for the combined information, wherein the propagating includes removing particles if their projected future state information does not correspond to the decrease in the determined amount of the difference for the current time period in light of the indicated goal, and wherein the propagating continues until at least one of a time window ends or the determined one or more particles provide the solution.

3. A computer-implemented method comprising:
    generating, by one or more computing systems, a model of a physical system whose operations include providing electrical power from multiple providers, wherein the model describes operational characteristics of the physical system and includes multiple rules that each has one or more conditions to evaluate and that specify restrictions involving a plurality of elements of the physical system and includes state information from sensors for the physical system and includes information about multiple control actions available to affect the providing of the electrical power and includes an indicated goal to maximize for the operations; and controlling, by the one or more computing systems and using the generated model, the operations of the physical system for an indicated time period, including:

receiving, by the one or more computing systems, information for the indicated time period that includes projected electrical power production available from the multiple providers and includes projected electrical power load;

generating, by the one or more computing systems, multiple particles that each represents a different set of state information for the physical system;

propagating, by the one or more computing systems, and for each of a plurality of iterations during a time window that lasts for at least some of the indicated time period, the respective state information for each of the multiple particles to attempt to determine projected future state information for the particle that reflects an improved ability of the physical system to satisfy the projected electrical power load using the projected electrical power production available from the multiple providers in light of the indicated goal, including combining information for the multiple particles for use in a next iteration;

determining, by the one or more computing systems, one or more of the multiple particles whose projected future state information provides a solution for the physical system to satisfy the projected electrical power load using the projected electrical power production available from the multiple providers in light of the indicated goal; and implementing, by the one or more computing systems, and using the solution for the determined one or more particles, at least one control action in the physical system to cause the multiple providers to satisfy the projected electrical power load for the indicated time period.

4. The computer-implemented method of claim 3 wherein the physical system includes an electrical grid that interconnects the multiple providers, wherein the received information further includes respective amounts of the projected electrical power production that is available from each of the multiple providers, and wherein the implementing of the at least one control action includes specifying, for each of the multiple providers, an indicated amount of electrical power production for that provider to provide for the indicated time period.

5. The computer-implemented method of claim 4 wherein the electrical grid further interconnects multiple consumers of electrical power from the multiple providers, wherein the received information further includes respective amounts of the projected electrical power load that are associated with each of the multiple consumers, and wherein the implementing of the at least one control action further includes specifying, for each of the multiple consumers, an indicated amount of electrical power load for that consumer to produce for the indicated time period.

6. The computer-implemented method of claim 3 further comprising:

updating, by the one or more computing systems, the generated model to reflect the implementing of the at least one control action using the at least determined particle, including to reflect updated state information for the physical system; and controlling, by the one or more computing systems and using the updated generated model, the operations of the physical system for multiple successive time periods after the indicated time period, including, for each of the multiple successive time periods:

receiving, by the one or more computing systems, further information that includes projected electrical power production available from the multiple providers for a current successive time period of the multiple successive time periods and includes projected electrical power load for the current successive time period;

generating, by the one or more computing systems, multiple particles for the current successive time period that each represents a different set of state information for the physical system;

propagating, by the one or more computing systems, and for each of a plurality of iterations during a time window that lasts for at least some of the current successive time period, the respective state information for each of the multiple particles to attempt to determine further projected future state information for the particle that reflects an improved ability of the physical system to satisfy the projected electrical power load for the current successive time period using the projected electrical power production available from the multiple providers for the current successive time period in light of the indicated goal, including using reinforcement learning as part of combining information for the multiple particles;

determining, by the one or more computing systems, at least one of the multiple particles for the current successive time period whose further projected future state information provides a further solution for the current successive time period for the physical system to satisfy the projected electrical power load for the current successive time period using the projected electrical power production available from the multiple providers for the current successive time period in light of the indicated goal;

implementing, by the one or more computing systems, and using the further solution for the at least one determined particle for the current successive time period, at least one further control action in the physical system to cause the multiple providers to satisfy the projected electrical power load for the current successive time period; and further updating, by the one or more computing systems, a current version of the generated model to reflect the implementing for the current successive time period of the at least one further control action, including to reflect further updated state information for the physical system.

7. The computer-implemented method of claim 3 further comprising performing, by the one or more computing systems and for each of the plurality of iterations, the combining of the information for the multiple particles using reinforcement learning to provide at least some improved state information for use in the next iteration.

8. The computer-implemented method of claim 7 wherein the combining of the information for the multiple particles using the reinforcement learning includes generating an updated hessian and gradient for the combined information, wherein the propagating includes removing particles if their projected future state information does not correspond to the improved ability of the physical system, and wherein the propagating continues until at least one of the time window ends or the determined one or more particles provide the solution.

9. The computer-implemented method of claim 3 wherein the multiple rules include binary rules that evaluate to true or false values and that use operating principles of the physical system as part of evaluating the state information, wherein the model further includes one or more soft rules that each specifies one or more additional conditions to be evaluated to reach one of multiple possible values other than true or false with an associated likelihood, and wherein the binary rules include one or more absolute rules that specify non-modifiable restrictions that are requirements regarding the operations of the physical system and further include one or more hard rules that specify restrictions regarding the operations of the physical system that can be modified in specified situations.

10. The computer-implemented method of claim 3 wherein the model includes a total Hamiltonian function that is based on the multiple rules for the model and on historical data from previous operations of the physical system, and wherein the method further comprises updating the model after the implementing to reflect the at least one control action by adding at least one mathematical expression to the total Hamiltonian function.

11. A system comprising:
one or more hardware processors of one or more computing systems; and
one or more memories with stored instructions that, when executed by at least one of the one or more hardware processors, cause the one or more computing systems to implement an automated control system for a physical system whose operations include providing electrical power, including:
obtaining a model of the physical system describing operational characteristics of the physical system and including state information from sensors for the physical system and including additional information about multiple control actions available to affect the providing of the electrical power and including an indicated goal to maximize for the operations; and
controlling, using the model, the operations of the physical system for an indicated time period, including:
receiving information that includes projected electrical power production available from the physical system for the indicated time period and includes projected electrical power load for the indicated time period;
generating multiple particles that each represents a different set of state information for the physical system;
propagating, for each of a plurality of iterations during a time window that lasts for at least some of the indicated time period, the respective state information for each of the multiple particles to attempt to determine projected future state information for the particle that reflects an improved ability of the physical system to satisfy the projected electrical power load using the projected electrical power production in light of the indicated goal, including combining information for the multiple particles for use in a next iteration;
determining, one or more of the multiple particles whose projected future state information provides a solution for the physical system to satisfy the projected electrical power load using the projected electrical power production in light of the indicated goal; and
providing information about the solution for the determined one or more particles, to enable at least one control action in the physical system that is based on that solution to cause the physical system to satisfy the projected electrical power load for the indicated time period.

12. The system of claim 11 wherein the physical system includes an electrical grid having multiple producers of electrical power for the electrical grid, wherein the received information further includes respective amounts of the projected electrical power production that is available from each of the multiple producers, and wherein the providing of the information includes providing, for each of the multiple producers, an indicated amount of electrical power production for that producer to provide for the indicated time period.

13. The system of claim 11 wherein the physical system includes an electrical grid having multiple consumers of electrical power for the electrical grid, wherein the received information further includes respective amounts of the projected electrical power load that are associated with each of the multiple consumers, and wherein the providing of the information includes providing, for each of the multiple consumers, an indicated amount of electrical power load for that consumer to produce for the indicated time period.

14. The system of claim 11 wherein the obtaining of the model includes receiving input that includes the state information and the additional information about the multiple control actions and the indicated goal, receiving information about multiple rules that each has one or more conditions to evaluate and that specify restrictions involving a plurality of elements of the physical system, and generating a total Hamiltonian function for use as the model that is based on the received input and the received information about the multiple rules.

15. A non-transitory computer-readable medium having stored contents that cause one or more computing systems to perform automated operations including at least:
generating, by the one or more computing systems and for a physical system, a model describing operational characteristics of the physical system and including multiple rules that each has one or more conditions to evaluate and that specify restrictions involving a plurality of elements of the physical system and including state information from sensors for the physical system and including information about multiple control actions available to affect operations of the physical system and includes an indicated goal to maximize for the operations; and
controlling, by the one or more computing systems and using the generated model, the operations of the physical system for an indicated time period, including:
receiving, by the one or more computing systems, information that includes projected functionality of an indicated type available from the physical system for the indicated time period and includes projected demand for the functionality for the indicated time period;
generating, by the one or more computing systems, multiple particles that each represents a different set of state information for the physical system;
determining, by the one or more computing systems and for each of a plurality of iterations during a time window that lasts for at least some of the indicated time period, and using the respective state information for each of the multiple particles, projected future state information for the particle that reflects an improved ability of the physical system to satisfy the projected demand for the functionality in light of the indicated goal, including combining information for the multiple particles for use in a next iteration;

determining, by the one or more computing systems, one or more of the multiple particles whose projected future state information provides a solution for the physical system to satisfy the projected demand for the functionality in light of the indicated goal; and implementing, by the one or more computing systems, and using the solution for the determined one or more particles, at least one control action in the physical system to cause the physical system to satisfy the projected demand for the functionality for the indicated time period.

16. The non-transitory computer-readable medium of claim 15 wherein the physical system includes an electrical grid, wherein the projected functionality of the indicated type includes projected electrical power available for the electrical grid from multiple producers of electrical power, wherein the received information further includes respective amounts of the projected electrical power production that is available from each of the multiple producers, and wherein the implementing of the at least one control action includes specifying, for each of the multiple producers, an indicated amount of electrical power production for that producer to provide for the indicated time period.

17. The non-transitory computer-readable medium of claim 15 wherein the physical system includes an electrical grid, wherein the projected demand for the functionality of the indicated type includes projected electrical power load from multiple consumers of electrical power, wherein the received information further includes respective amounts of the projected electrical power load that are associated with each of the multiple consumers, and wherein the implementing of the at least one control action includes specifying, for each of the multiple consumers, an indicated amount of electrical power load for that consumer to produce for the indicated time period.

18. The non-transitory computer-readable medium of claim 15 wherein the physical system is a vehicle, wherein the plurality of elements include a motor and a battery of the vehicle, wherein the control actions affect one or more control elements to select whether to remove energy from the battery to power the motor or to add excess energy to the battery and how much energy to remove from the battery, and wherein the goal includes to move the vehicle at one or more specified speeds with a minimum of energy produced from the battery.

19. The non-transitory computer-readable medium of claim 18 wherein the plurality of elements further includes an engine that is manipulatable to modify energy generated from the engine, wherein the control actions further affect one or more additional control elements to determine how much energy to generate from the engine for use at least in part in adding the excess energy to the battery, and wherein the goal further includes to minimize use of fuel by the engine.

20. The non-transitory computer-readable medium of claim 15 wherein the physical system includes a battery, wherein the plurality of elements include one or more controls that are manipulatable to modify an amount of electrical power produced from or received by the battery, wherein the control actions affect the controls to select how much electrical power to produce from the battery or receive by the battery, and wherein the goal includes maximizing life of the battery while supplying electrical power to and/or from the battery according to indicated criteria.

21. The non-transitory computer-readable medium of claim 15 wherein the automated operations further include:

updating, by the one or more computing systems, the generated model to reflect the implementing of the at least one control action using the at least determined particle, including to reflect updated state information for the physical system; and controlling, by the one or more computing systems and using the updated generated model, the operations of the physical system for multiple successive time periods after the indicated time period, including, for each of the multiple successive time periods:

receiving, by the one or more computing systems, further information that includes projected available functionality of an indicated type from the physical system for a current successive time period of the multiple successive time periods and includes projected demand for the functionality for the current successive time period;

generating, by the one or more computing systems, multiple particles for the current successive time period that each represents a different set of state information for the physical system;

propagating, by the one or more computing systems, and for each of a plurality of iterations during a time window that lasts for at least some of the current successive time period, the respective state information for each of the multiple particles to attempt to determine further projected future state information for the particle that reflects improved ability of the physical system to satisfy the projected demand for the current successive time period for the functionality using the projected available functionality for the current successive time period in light of the indicated goal, including using reinforcement learning as part of combining information for the multiple particles;

determining, by the one or more computing systems, one or more of the multiple particles for the current successive time period whose further projected future state information provides a further solution for the current successive time period for the physical system to satisfy the projected demand for the current successive time period for the functionality using the projected available functionality for the current successive time period in light of the indicated goal;

implementing, by the one or more computing systems, and using the further solution for the determined one or more particles for the current successive time period, at least one control action in the physical system to cause the multiple providers to satisfy the projected demand for the current successive time period for the functionality using the projected available functionality for the current successive time period; and further updating, by the one or more computing systems, a current version of the generated model to reflect the implementing for the current successive time period of the at least one control action using the at least determined particle, including to reflect further updated state information for the physical system.

22. The non-transitory computer-readable medium of claim 15 wherein the projected demand for the functionality exceeds the projected functionality available by a difference having a determined amount, and wherein the determining of the one or more particles includes measuring, for each of the one or more particles, a reduced difference using a Kullback-Liebler distance measure.

23. The non-transitory computer-readable medium of claim 15 wherein the determining for each of the plurality of iterations of the projected future state information includes providing information about current state information for that particle and that iteration to a vectorization engine having one or more graphical processing units (GPUs), for use by the vectorization engine to attempt to determine the projected future state information for that particle and that iteration using the one or more GPUs and a scalar model of a particle.

24. The non-transitory computer-readable medium of claim 15 wherein the indicated goal includes minimizing one or more indicated factors for the operations, wherein the indicated factors include at least one of unavailability of the physical system or cost associated with the physical system or aging of one or more elements of the physical system.

25. The non-transitory computer-readable medium of claim 15 wherein the automated operations further include performing, by the one or more computing systems and for each of the plurality of iterations, the combining of the information for the multiple particles using reinforcement learning to provide at least some improved state information for use in the next iteration.

26. The non-transitory computer-readable medium of claim 25 wherein the combining of the information for the multiple particles using the reinforcement learning includes generating an updated hessian and gradient for the combined information.

27. The non-transitory computer-readable medium of claim 15 wherein the determining of the projected future state information for each of the particles and each of the iterations includes removing the particle if its projected future state information does not correspond to the improved ability of the physical system.

28. The non-transitory computer-readable medium of claim 15 wherein the determining of the projected future state information for each of the particles and each of the iterations continues until at least one of the time window ends or the determined one or more particles provide the solution.

29. The non-transitory computer-readable medium of claim 15 wherein the multiple rules include binary rules that evaluate to true or false values and that use operating principles of the physical system as part of evaluating the state information, wherein the model further includes one or more soft rules that each specifies one or more additional conditions to be evaluated to reach one of multiple possible values other than true or false with an associated likelihood, and wherein the binary rules include one or more absolute rules that specify non-modifiable restrictions that are requirements regarding the operations of the physical system and further include one or more hard rules that specify restrictions regarding the operations of the physical system that can be modified in specified situations.

30. The non-transitory computer-readable medium of claim 15 wherein the model includes a Hamiltonian function that is based on the multiple rules for the model and on historical data from previous operations of the physical system, and wherein the stored contents include software instructions that, when executed, further cause the one or more computing systems to update the model after the implementing to reflect the at least one control action by adding at least one mathematical expression to the Hamiltonian function.

* * * * *